(12) United States Patent
Jiang et al.

(10) Patent No.: US 11,562,469 B2
(45) Date of Patent: *Jan. 24, 2023

(54) SYSTEM AND METHOD FOR IMAGE PROCESSING

(71) Applicant: SHANGHAI UNITED IMAGING HEALTHCARE CO., LTD., Shanghai (CN)

(72) Inventors: Chunhua Jiang, Shanghai (CN); Shurui Zhao, Shanghai (CN); Hanyu Wang, Shanghai (CN); Haihua Zhou, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 59 days.

This patent is subject to a terminal disclaimer.

(21) Appl. No.: 17/201,084

(22) Filed: Mar. 15, 2021

(65) Prior Publication Data

US 2021/0201451 A1 Jul. 1, 2021

Related U.S. Application Data

(63) Continuation of application No. 16/023,340, filed on Jun. 29, 2018, now Pat. No. 10,949,950, which is a (Continued)

(30) Foreign Application Priority Data

Jun. 14, 2017 (CN) .......................... 201710447718.9
Jun. 14, 2017 (CN) .......................... 201710468784.4

(51) Int. Cl.
*G06K 9/34* (2006.01)
*G06T 5/00* (2006.01)
(Continued)

(52) U.S. Cl.
CPC .............. *G06T 5/002* (2013.01); *G06T 5/009* (2013.01); *G06T 5/10* (2013.01); *G06T 7/0012* (2013.01);
(Continued)

(58) Field of Classification Search
CPC ... G06T 5/002; G06T 5/009; G06T 5/10; G06T 7/0012; G06T 7/11; G06T 7/136;
(Continued)

(56) References Cited

U.S. PATENT DOCUMENTS

| 10,290,108 B2 | 5/2019 | Zhang et al. |
| 2006/0167355 A1 | 7/2006 | Rico et al. |

(Continued)

FOREIGN PATENT DOCUMENTS

| CN | 104274201 A | 1/2015 |
| CN | 104574361 A | 4/2015 |

(Continued)

OTHER PUBLICATIONS

International Search Report in PCT/CN2017/120325 dated Mar. 27, 2018, 4 pages.

(Continued)

*Primary Examiner* — Stephen P Coleman
(74) *Attorney, Agent, or Firm* — Metis IP LLC

(57) ABSTRACT

A system and method for image processing are provided. A pre-processed image may be obtained. The pre-processed image may be decomposed into a low-frequency image and a high-frequency image. At least one grayscale transformation range may be determined based on the low-frequency image. At least one grayscale transformation parameter may be determined based on the at least one grayscale transformation range. The low-frequency image may be transformed based on the at least one grayscale transformation parameter to obtain a transformed low-frequency image. A transformed (Continued)

image may be generated by reconstructing the transformed low-frequency image and the high-frequency image.

20 Claims, 17 Drawing Sheets

Related U.S. Application Data continuation of application No. PCT/CN2017/120325, filed on Dec. 29, 2017.

(51) Int. Cl.
*G06T 7/11* (2017.01)
*G06T 7/44* (2017.01)
*G06T 7/00* (2017.01)
*G06T 7/136* (2017.01)
*G06T 5/10* (2006.01)

(52) U.S. Cl.
CPC .............. *G06T 7/11* (2017.01); *G06T 7/136* (2017.01); *G06T 7/44* (2017.01); *G06T 2207/10081* (2013.01); *G06T 2207/30068* (2013.01)

(58) Field of Classification Search
CPC ............. G06T 7/44; G06T 2207/10081; G06T 2207/30068
USPC ........................................................ 382/173
See application file for complete search history.

(56) References Cited

U.S. PATENT DOCUMENTS

| | | | |
|---|---|---|---|
| 2007/0047793 A1 | 3/2007 | Wu et al. | |
| 2009/0252396 A1* | 10/2009 | Morita | G06T 7/11 382/132 |
| 2012/0063662 A1 | 3/2012 | Kwon et al. | |
| 2013/0223711 A1 | 8/2013 | Knapp et al. | |
| 2013/0272493 A1 | 10/2013 | Otokuni et al. | |
| 2015/0093013 A1 | 4/2015 | Morita | |
| 2016/0350910 A1 | 12/2016 | Jeong et al. | |

FOREIGN PATENT DOCUMENTS

| | | |
|---|---|---|
| CN | 104616255 A | 5/2015 |
| CN | 104952044 A | 9/2015 |
| CN | 105701796 A | 6/2016 |
| CN | 106228520 A | 12/2016 |
| CN | 107292815 A | 10/2017 |
| CN | 107316291 A | 11/2017 |

OTHER PUBLICATIONS

Written Opinion in PCT/CN2017/120325 dated Mar. 27, 2018, 5 pages.
The Extended European Search Report in European Application No. 17914031.4 dated Feb. 27, 2020, 7 pages.
First Office Action in Chinese Application No. 201710468784. 4 dated Feb. 28, 2020, 23 pages.
First Office Action in Chinese Application No. 201710447718.9 dated Apr. 28, 2019, 24 pages.
Luan Mengjie et al., Manmmogram Image Enhancement Based on Wavelet Fusion, Computer Engineering and Applications, 46(18): 177-179, 2010.
Dong Yin et al., A Method of Breast Tumour MRI Segmentation and 3D Reconstruction, 2015 7th International Conference on Information Technology in Medicine and Education(ITME), pp. 23-26, 2016.
Notification to Grant Patent Right for Invention in Chinese Application No. 201710447718.9 dated Jul. 27, 2020, 6 pages.

* cited by examiner

SYSTEM AND METHOD FOR IMAGE PROCESSING

CROSS-REFERENCE TO RELATED APPLICATIONS

This present application is a continuation of U.S. application Ser. No. 16/023,340 filed on Jun. 29, 2018, which is a continuation of International Application No. PCT/CN2017/120325, filed on Dec. 29, 2017, which claims priority to Chinese Patent Application No. 201710447718.9, filed on Jun. 14, 2017, and Chinese Patent Application No. 201710468784.4, filed on Jun. 14, 2017, the entire contents of each of which are hereby incorporated by reference.

TECHNICAL FIELD

The present disclosure generally relates to image processing, and more particularly, relates to a system and method for transforming an image.

BACKGROUND

An imaging system may play a significant role in the medical field. An imaging system may generate and/or process a medical image (e.g., a CT image, a PET image, an MRI image, etc.) for medical diagnose or radioactive therapy. For instance, a CT image of a breast may be used to screen a lump in the breast. Usually, a medical image may be adjusted, in order to facilitate a doctor to identify a potential lesion. For instance, a breast image obtained by a full-field digital mammography (FFDM) system may have an uneven grayscale distribution as the tissue can hardly be completely compressed for imaging. The breast image may be denoised and/or enhanced by different techniques of image processing. However, the adjustment for the image may be inefficient and/or ineffective. For instance, an edge of a region of interest in the breast image may be missed; gray levels in the image may be uneven, or image noise may be enhanced. Hence, it is desirable to develop an image transformation technique that may enhance a contrast of the image and/or denoise the image.

SUMMARY

One aspect of the present disclosure relates to a method for image processing. The method may be implemented on at least one machine each of which has at least one processor and one storage. The method may include one or more of the following operations. A pre-processed image may be obtained. The pre-processed image may be decomposed into a low-frequency image and a high-frequency image. At least one grayscale transformation range may be determined based on the low-frequency image. At least one grayscale transformation parameter may be determined based on the at least one grayscale transformation range. The low-frequency image may be transformed based on the at least one grayscale transformation parameter to obtain a transformed low-frequency image. A transformed image may be generated by reconstructing the transformed low-frequency image and the high-frequency image.

Another aspect of the present disclosure relates to a non-transitory computer readable medium storing instructions. The instructions, when executed by at least one processor, may cause the at least one processor to implement the method for image processing.

A further aspect of the present disclosure relates to a system for image processing. The system may include at least one storage device including a set of instructions or programs; and at least one processor configured to communicate with the at least one storage device, wherein when executing the set of instructions or programs, the at least one processor is configured to cause the system to: obtain a pre-processed image; decompose the pre-processed image into a low-frequency image and a high-frequency image; determine at least one grayscale transformation range based on the low-frequency image; determine at least one grayscale transformation parameter based on the at least one grayscale transformation range; transform, based on the at least one grayscale transformation parameter, the low-frequency image to obtain a transformed low-frequency image; and generate a transformed image by reconstructing the transformed low-frequency image and the high-frequency image.

A further aspect of the present disclosure relates to a system for image processing. The system may include at least one processor and a storage configured to store instructions. The system may further include an acquisition module configured to obtain a pre-processed image; a decomposition block configured to decompose the pre-processed image into a low-frequency image and a high-frequency image; a grayscale transformation range determination block configured to determine at least one grayscale transformation range based on the low-frequency image; a grayscale transformation parameter determination block configured to determine at least one grayscale transformation parameter based on the at least one grayscale transformation range; a grayscale transformation block configured to transform, based on the at least one grayscale transformation parameter, the low-frequency image to obtain a transformed low-frequency image; and an image reconstruction block configured to generate a transformed image by reconstructing the transformed low-frequency image and the high-frequency image.

In some embodiments, the obtaining of a pre-processed image may include one or more of the following operations: obtaining an initial image; and pre-processing the initial image to obtain the pre-processed image.

In some embodiments, the pre-processing of the initial image to obtain the pre-processed image may include one or more of the following operations: performing a logarithmic transformation on the initial image to obtain the pre-processed image.

In some embodiments, the determining of at least one grayscale transformation range based on the low-frequency image may include one or more of the following operations: segmenting the low-frequency image to obtain a segmented low-frequency image; and determining the at least one grayscale transformation range based on the segmented low-frequency image.

In some embodiments, the pre-processing of the initial image to obtain the pre-processed image may include one or more of the following operations: segmenting the initial image to obtain a segmented image; and performing a logarithmic transformation on the segmented image to obtain the pre-processed image.

In some embodiments, the pre-processing of the initial image to obtain the pre-processed image may include one or more of the following operations: performing a logarithmic transformation on the initial image to obtain an intermediate image; and segmenting the intermediate image to obtain a segmented intermediate image, the segmented intermediate image being the pre-processed image.

In some embodiments, the decomposing of the pre-processed image into a low-frequency image and a high-frequency image may include one or more of the following operations: decomposing the pre-processed image into the low-frequency image and the high-frequency image by filtering the pre-processed image based on a filtering algorithm.

In some embodiments, the filtering algorithm may include a bilateral filtering algorithm or a wavelet filtering algorithm.

In some embodiments, the determining of at least one grayscale transformation range based on the low-frequency image may include one or more of the following operations: determining the at least one grayscale transformation range based on the pre-processed image, a first grayscale distribution characteristic of gland in the low-frequency image, and a second grayscale distribution characteristic of fat in the low-frequency image.

In some embodiments, the determining of the at least one grayscale transformation range based on the pre-processed image, a first grayscale distribution characteristic of gland in the low-frequency image, and a second grayscale distribution characteristic of fat in the low-frequency image may include one or more of the following operations: determining a maximal gray value of the pre-processed image; determining a minimal gray value of the at least one grayscale transformation range based on the first grayscale distribution characteristic of gland in the low-frequency image and the second grayscale distribution characteristic of fat in the low-frequency image; and determining the at least one grayscale transformation range based on the maximal gray value and the minimal gray value.

In some embodiments, the determining of a minimal gray value of the at least one grayscale transformation range based on the first grayscale distribution characteristic of gland in the low-frequency image and the second grayscale distribution characteristic of fat in the low-frequency image may include one or more of the following operations: generating a first low-frequency image by editing the low-frequency image; determining a segmentation threshold; segmenting the first low-frequency image based on the segmentation threshold; determining a first grayscale mean value of gland in the low-frequency image based on the segmented first low-frequency image; determining a second grayscale mean value of fat in the low-frequency image based on the segmented first low-frequency image; and determining the minimal gray value of the at least one grayscale transformation range based on the segmentation threshold, the first grayscale mean value, and the second grayscale mean value.

In some embodiments, the generating of a first low-frequency image by editing the low-frequency image may include one or more of the following operations: determining a width of a target organ based on the low-frequency image; editing the low-frequency image by clipping the low-frequency image based on the width of the target organ to obtain a second low-frequency image; and generating the first low-frequency image by editing a histogram of the second low-frequency image.

In some embodiments, the target organ may be a breast.

In some embodiments, the determining of a width of a target organ based on the low-frequency image may include one or more of the following operations: determining a third low-frequency image by removing a first predetermined region of the low-frequency image or by extracting a second predetermined region of the low-frequency image, the first predetermined region including a non-target organ, the second predetermined region including at least a portion of the target organ; and determining a maximal distance between a contour of the target organ and an edge of the third low-frequency image, the edge of the third low-frequency image being opposite to the contour of the target organ.

In some embodiments, the determining of the minimal gray value of the at least one grayscale transformation range based on the segmentation threshold, the first grayscale mean value, and the second grayscale mean value may include one or more of the following operations: determining a grayscale difference between the first grayscale mean value and the second grayscale mean value; determining a grayscale range of the pre-processed image based on the maximal gray value; dividing the grayscale range into a predetermined number of sub-ranges; determining a target sub-range including the grayscale difference; and determining the minimal gray value based on the target sub-range, the segmentation threshold, the second grayscale mean value, and a determination function.

In some embodiments, the determining of the minimal gray value based on the target sub-range, the segmentation threshold, the second grayscale mean value, and the determination function may include one or more of the following operations: determining a coefficient relating to a determination function for determining the minimal gray value based on the target sub-range; and determining the minimal gray value based on the coefficient, the segmentation threshold, the second grayscale mean value, and the determination function.

In some embodiments, the determining of a coefficient relating to a determination function for determining the minimal gray value based on the target sub-range may include one or more of the following operations: in response to the determination that the target sub-range includes a maximal value of the grayscale range, determining the coefficient as a predetermined value.

In some embodiments, the determining of a coefficient relating to a determination function for determining the minimal gray value based on the target sub-range may include one or more of the following operations: in response to the determination that the target sub-range does not include a maximal value of the grayscale range, determining the coefficient based on the grayscale difference and a maximal value of the target sub-range.

In some embodiments, the determining of at least one grayscale transformation range based on the low-frequency image may include one or more of the following operations: determining a reference distance for determining a transformation region in the low-frequency image; determining a first edge and a second edge of a transformation region, the first edge being a contour in the pre-processed image, a distance between the second edge and the first edge being equal to the reference distance; determining, based on the first edge and second edge, the transformation region; and determining the at least one grayscale transformation range based on gray values of a plurality of elements in the transformation region, each of the plurality of elements in the transformation region being a pixel or voxel.

In some embodiments, the determining of the at least one grayscale transformation range based on gray values of a plurality of elements in the transformation region may include one or more of the following operations: determining a maximal gray value of a first set of elements on the first edge; determining a mean gray value of a second set of elements on the second edge; and determining the at least one grayscale transformation range based on the maximal gray value and the mean gray value.

In some embodiments, the determining of a reference distance for determining a transformation region in the low-frequency image may include one or more of the following operations: determining a width of an organ based on the low-frequency image; obtaining a compression thickness of the organ; and determining the reference distance based on the width, the compression thickness, and a predetermined distance determination model.

In some embodiments, the organ may be a breast.

In some embodiments, the at least one grayscale transformation parameter may relate to a transformation curve, and the determining of the at least one grayscale transformation parameter based on the at least one grayscale transformation range may include one or more of the following operations: determining a reference edge in the low-frequency image; determining a plurality of distances between a plurality of elements in the low-frequency image and the reference edge; determining a plurality of mean gray values corresponding to the plurality of distances, including determining one or more gray values corresponding to one or more elements of the plurality of elements in the low-frequency image, the one or more elements having a same distance, and determining a mean gray value of the plurality of mean gray values based on the one or more gray values; determining a characteristic curve based on the plurality of mean gray values and the plurality of distances; and determining, based on the characteristic curve, the transformation curve, the transformation curve indicating a relationship between a first gray value before transformation and a second gray value after transformation.

In some embodiments, the generating of a transformed image by reconstructing the transformed low-frequency image and the high-frequency image may include one or more of the following operations: determining, based on a first gray value of a first element in the transformed low-frequency image and a second gray value of a second element in the high-frequency image, a target gray value of each element in the transformed image, the each element being a pixel or voxel.

In some embodiments, the pre-processed image may include a breast.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Figure 2:
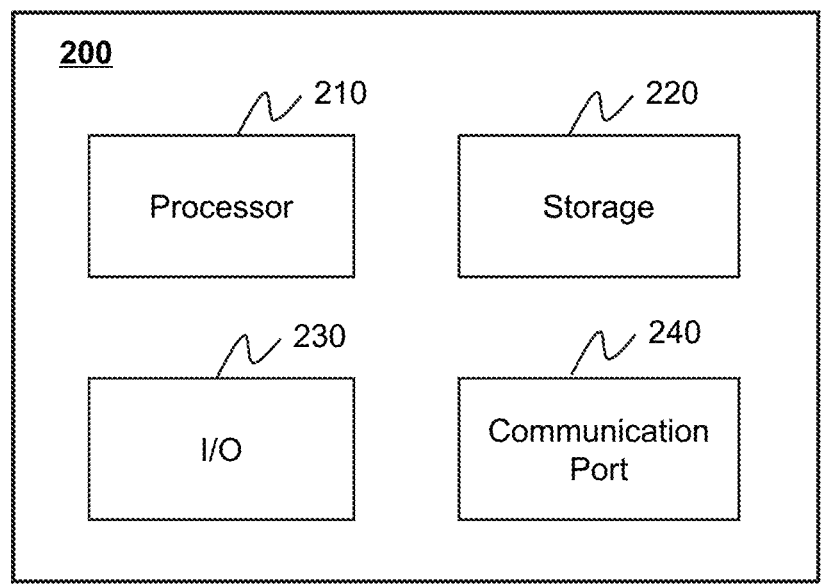
FIG. 2 is a schematic diagram illustrating exemplary hardware and/or software components of a computing device on which the processing engine may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

In some embodiments, the imaging system may include one or more modalities including Digital Subtraction Angiography (DSA), Magnetic Resonance Imaging (MRI), Magnetic Resonance Angiography (MRA), Computed tomography (CT), Computed Tomography Angiography (CTA), Ultrasound Scanning (US), Positron Emission Tomography (PET), Single-Photon Emission Computerized Tomography (SPECT), CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof. In some embodiments, a subject to be scanned by the imaging system may be an organ, texture, a lesion, a tumor, substance, or the like, or any combination thereof. Merely by way for example, the subject may include a head, a breast, a lung, a rib, a vertebra, a trachea, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. As another example, the subject may include a physical model. In some embodiments, the image generated by the imaging system may include a 2D image and/or a 3D image. In the 2D image, its tiniest distinguishable element may be termed as a pixel. In the 3D image, its tiniest distinguishable element may be termed as a voxel ("a volumetric pixel" or "a volume pixel"). In some embodiments, the 3D image may also be seen as a series of 2D slices or 2D layers.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The following description is provided with reference to an image processing technique for transforming an image. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

Figure 1:
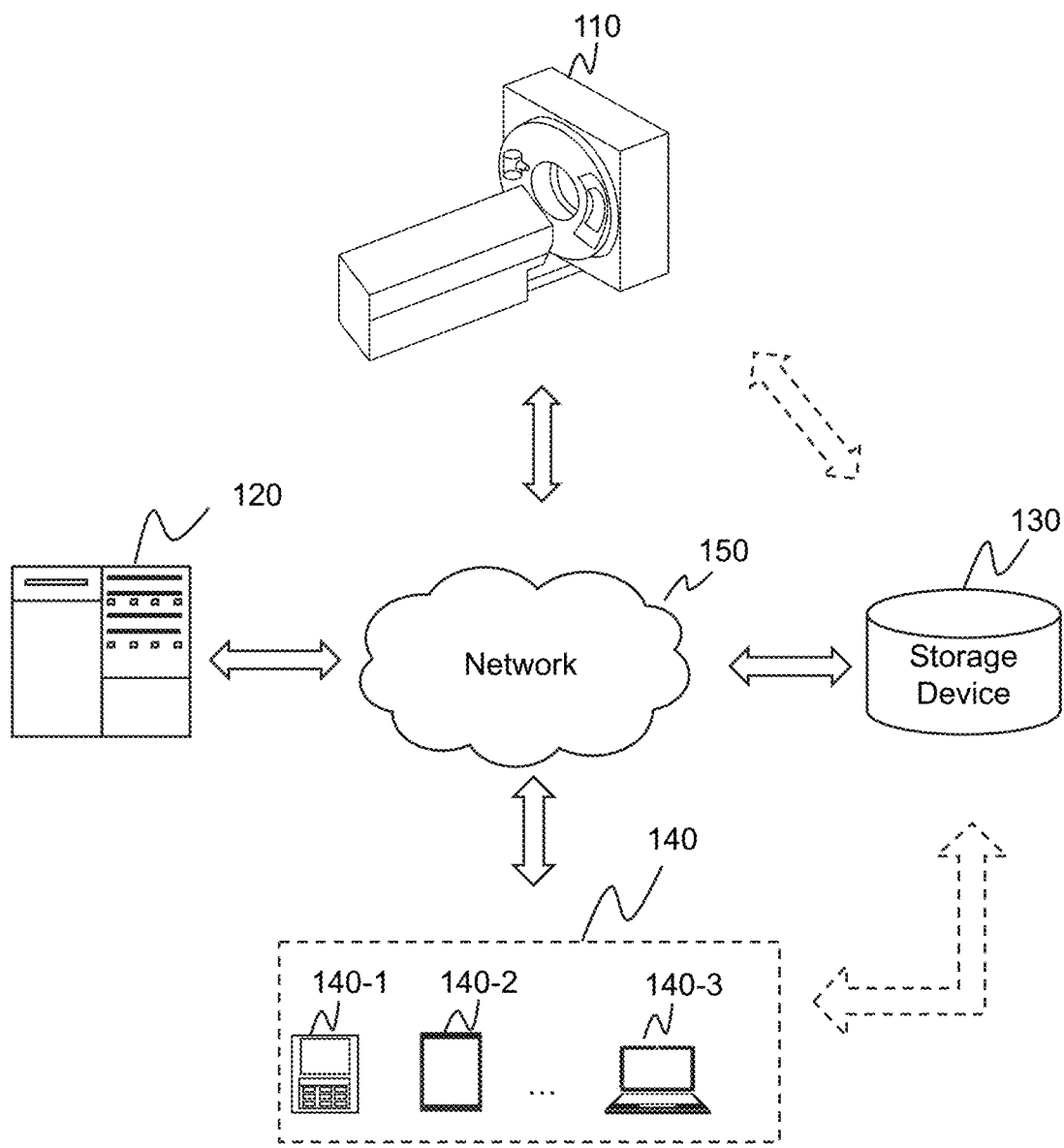
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As shown, the imaging system 100 may include a scanner 110, a processing device 120, a storage device 130, one or more terminals 140, and a network 150. The components in the imaging system 100 may be connected in one or more of various ways. Merely by way of example, as illustrated in FIG. 1, the scanner 110 may be connected to the processing device 120 through the network 150. As another example, the scanner 110 may be connected to the processing device 120 directly as indicated by the bi-directional arrow in dotted lines linking the scanner 110 and the processing device 120. As a further example, the storage device 130 may be connected to the processing device 120 directly or through the network 150. As still a further example, one or more terminals 140 may be connected to the processing device 120 directly (as indicated by the bi-directional arrow in dotted lines linking the terminal 140 and the processing device 120) or through the network 150. In some embodiments, the imaging system 100 may be a breast xeroradiography system, a film-screen mammography system, a full-field digital mammography (FFDM) system, a digital breast tomosynthesis (DBT) system, a contrast-enhanced digital mammography (CEDM) system, etc. The imaging system 100 may generate a two-dimensional (2D) or three-dimensional (3D) image.

The scanner 110 may generate or provide image data via scanning a subject or a part of the subject. In some embodiments, the scanner 110 may be a medical imaging device, for example, a PET device, a SPECT device, a CT device, an MRI device, or the like, or any combination thereof (e.g., a PET-CT device, a PET-MRI device, etc.). In some embodiments, the scanner 110 may include a single-modality scanner. The single-modality scanner may include, for example, a magnetic resonance imaging (MRI) scanner 110-1, a computed tomography (CT) scanner 110-2, and/or a positron emission tomography (PET) scanner 110-3. In some embodiments, the scanner 110 may include both the CT scanner 110-2 and the PET scanner 110-3. In some embodiments, image data of different modalities related to the subject, such as CT image data and PET image data, may be acquired using different scanners separately. In some embodiments, the scanner 110 may include a multi-modality scanner. The multi-modality scanner may include a positron emission tomography-computed tomography (PET-CT) scanner, a positron emission tomography-magnetic resonance imaging (PET-MRI) scanner, or the like, or any combination thereof. The multi-modality scanner may perform multi-modality imaging simultaneously. For example, the PET-CT scanner may generate structural X-ray CT image data and functional PET image data simultaneously in a single scan. The PET-MRI scanner may generate MRI data and PET data simultaneously in a single scan.

In some embodiments, the subject may include a body, substance, or the like, or any combination thereof. In some embodiments, the subject may include a specific portion of a body, such as a head, a thorax, an abdomen, or the like, or any combination thereof. In some embodiments, the subject may include a specific organ, such as a breast, an esophagus, a trachea, a bronchus, a stomach, a gallbladder, a small intestine, a colon, a bladder, a ureter, a uterus, a fallopian tube, etc. In some embodiments, the subject may include a physical model (also referred to as a mockup). The physical model may include one or more materials constructed as different shapes and/or dimensions. Different parts of the physical model may be made of different materials. Different materials may have different X-ray attenuation coefficients, different tracer isotopes, and/or different hydrogen proton contents. Therefore, different parts of the physical model may be recognized by the imaging system 100. In the present disclosure, "object" and "subject" are used interchangeably. In some embodiments, the scanner 110 may include a scanning table. The subject may be placed on the scanning table for imaging.

In some embodiments, the scanner 110 may transmit the image data via the network 150 to the processing device 120, the storage device 130, and/or the terminal(s) 140. For example, the image data may be sent to the processing device 120 for further processing or may be stored in the storage device 130.

The processing device 120 may process data and/or information obtained from the scanner 110, the storage device 130, and/or the terminal(s) 140. For example, the processing device 120 may determine one or more transformation parameters for transforming one or more images (e.g., a breast image) based on the image data collected by the scanner 110. In some embodiments, the processing device 120 may be a single server or a server group. The server group may be centralized or distributed. In some embodiments, the processing device 120 may be local or remote. For example, the processing device 120 may access information and/or data from the scanner 110, the storage device 130, and/or the terminal(s) 140 via the network 150. As another example, the processing device 120 may be directly connected to the scanner 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be implemented by a computing device 200 having one or more components as described in connection with FIG. 2.

The storage device 130 may store data, instructions, and/or any other information. In some embodiments, the storage device 130 may store data obtained from the scanner 110, the processing device 120, and/or the terminal(s) 140. In some embodiments, the storage device 130 may store data and/or instructions that the processing device 120 may execute or use to perform exemplary methods described in the present disclosure. In some embodiments, the storage device 130 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform as described elsewhere in the disclosure. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the imaging system 100 (e.g., the processing device 120, the terminal(s) 140, etc.). One or more components in the imaging system 100 may access the data or instructions stored in the storage device 130 via the network 150. In some embodiments, the storage device 130 may be part of the processing device 120.

The terminal(s) 140 may be connected to and/or communicate with the scanner 110, the processing device 120, and/or the storage device 130. For example, the terminal(s) 140 may obtain a processed image from the processing device 120. As another example, the terminal(s) 140 may obtain image data acquired by the scanner 110 and transmit the image data to the processing device 120 to be processed. In some embodiments, the terminal(s) 140 may include a mobile device 140-1, a tablet computer 140-2, a laptop computer 140-3, or the like, or any combination thereof. For example, the mobile device 140-1 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. The input information received through the input device may be transmitted to the processing device 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing device 120.

The network 150 may include any suitable network that can facilitate the exchange of information and/or data for the imaging system 100. In some embodiments, one or more components of the imaging system 100 (e.g., the scanner 110, the processing device 120, the storage device 130, the terminal(s) 140, etc.) may communicate information and/or data with one or more other components of the imaging system 100 via the network 150. For example, the processing device 120 may obtain image data from the scanner 110 via the network 150. As another example, the processing device 120 may obtain user instruction(s) from the terminal (s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 130 may be a data storage including cloud computing platforms, such as public cloud, private cloud, community, and hybrid clouds, etc. However, those variations and modifications do not depart from the scope of the present disclosure.

FIG. 2 is a schematic diagram illustrating exemplary hardware and/or software components of a computing device 200 on which the processing device 120 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the scanner 110, the terminal(s) 140, the storage device 130, and/or any other component of the Imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the scanner 110, the terminal(s) 140, the storage device 130, and/or any other component of the imaging system 100. In some embodiments, the storage 220 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 120 for determining one or more registration parameters related to multi-modality images acquired by the imaging system 100.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 150) to facilitate data communications. The communication port 240 may establish connections between the processing device 120 and the scanner 110, the terminal(s) 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
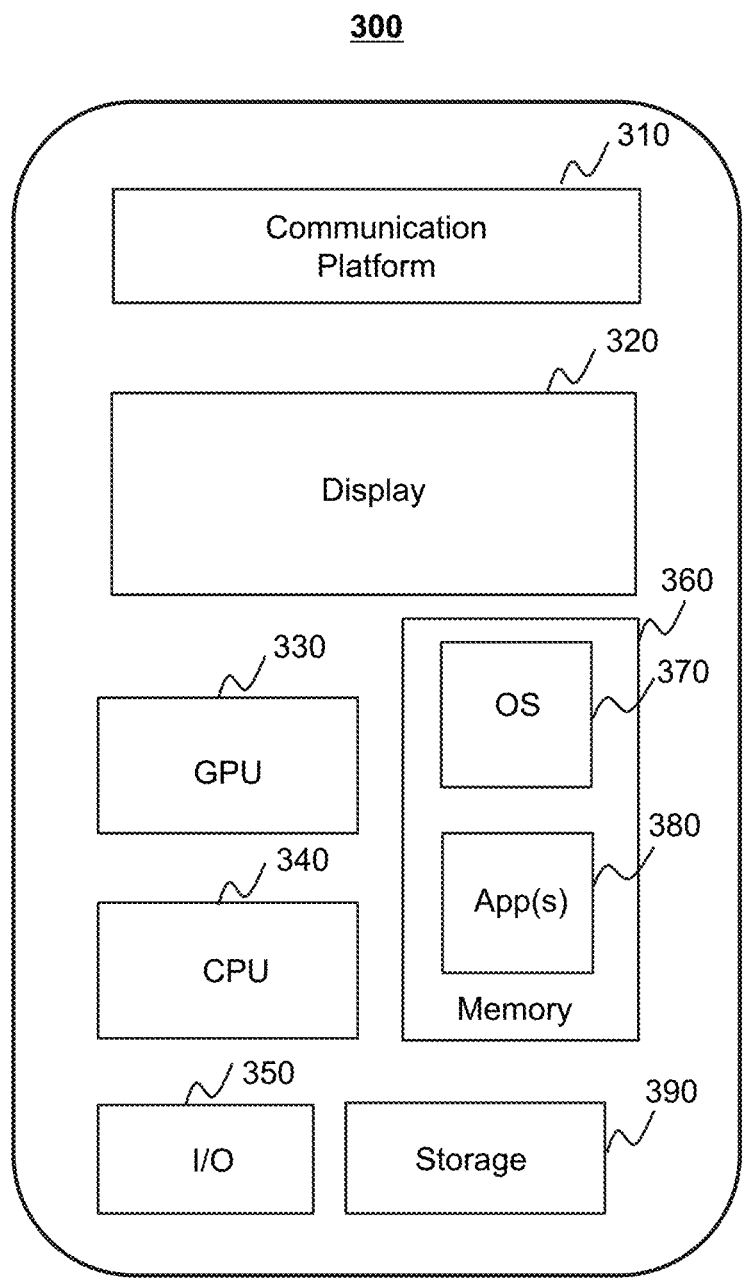
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 on which the terminal(s) 140 may be implemented according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information respect to image processing or other information from the processing device 120. User interactions with the information stream may be achieved via the I/O 350 and provided to the processing device 120 and/or other components of the imaging system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of workstation or external device. A computer may also act as a server if appropriately programmed.

Figure 4:
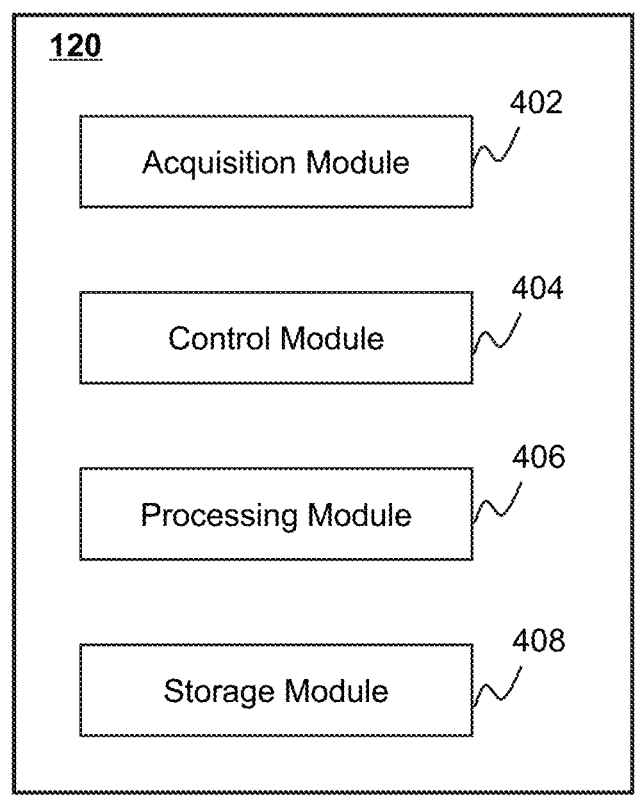
FIG. 4 is a block diagram illustrating an exemplary processing device according to some embodiments of the present disclosure.

FIG. 4 is a block diagram illustrating an exemplary processing device according to some embodiments of the present disclosure. The processing device 120 may include an acquisition module 402, a control module 404, a processing module 406, and a storage module 408. At least a portion of the processing device 120 may be implemented on a computing device as illustrated in FIG. 2 or a mobile device as illustrated in FIG. 3.

The acquisition module 402 may acquire image data. The acquisition module 402 may acquire the image data from the scanner 110, the storage device 130, and/or the terminal(s) 140. In some embodiments, the acquisition module 402 may acquire the image data from an external data source via the network 150. In some embodiments, the image data may correspond to X-rays that pass through a subject. In the present disclosure, "subject" and "object" are used interchangeably. In some embodiments, a radioactive scanning source may emit the X-rays to the subject. The X-rays may pass through the subject and may attenuate during the passing-through. The extent of attenuation of an X-ray may depend on factors including, for example, the property of the subject the X-ray passes through, the thickness of the subject that the X-ray passes through, etc. The attenuated X-rays may be detected by a detector and transmitted to the acquisition module 402. In some embodiments, the acquisition module 402 may acquire instructions for processing the image data. The instructions may be executed by the processor(s) of the processing device 120 to perform exemplary methods described in this disclosure. In some embodiments, the acquired data may be transmitted to the storage module 408 to be stored.

The control module 404 may control operations of the acquisition module 402, the storage module 408, the processing module 406 (e.g., by generating one or more control parameters), the scanner 110, or the like, or a combination thereof. For example, the control module 404 may control the acquisition module 402 to acquire image data, the timing of the acquisition of the image data, etc. As another example, the control module 404 may control the processing module 406 to process image data acquired by the acquisition module 402. As a further example, the control module 404 may control the operation of the scanner 110. In some embodiments, the control module 404 may receive a real-time instruction from an operator or retrieve a predetermined instruction provided by a user (e.g., a doctor, a technician, an engineer, etc.) to control one or more operations of the scanner 110, the acquisition module 402, and/or the processing module 406. For example, the control module 404 may adjust the acquisition module 402 and/or the processing module 406 to generate one or more images of a subject according to the real-time instruction and/or the predetermined instruction. In some embodiments, the control module 404 may communicate with one or more other modules of the processing device 120 for exchanging information and/or data.

The processing module 406 may process information provided by various modules of the processing device 120. The processing module 406 may process image data acquired by the acquisition module 402, image data retrieved from the storage module 408 and/or the storage device 130, etc. In some embodiments, the processing module 406 may reconstruct one or more images based on the image data according to a reconstruction technique, generate reports including one or more images and/or other related information, and/or perform any other function for image reconstruction in accordance with various embodiments of the present disclosure. The reconstruction technique may include an iterative reconstruction algorithm (e.g., a statistical reconstruction algorithm), a Fourier slice theorem algorithm, a filtered back projection (FBP) algorithm, a fan-beam reconstruction algorithm, an analytic reconstruction algorithm, or the like, or any combination thereof. In some embodiments, the processing module 406 may reduce or remove artifacts and/or noise in iterative reconstruction. In some embodiments, the processing module 406 may register multi-modality images. For example, the processing module 406 may register a CT image and a PET image. As another example, the processing module 406 may register an MRI image and a PET image. In some embodiments, the processing module 406 may transform an image. In some embodiments, the processing module 406 may change the values (e.g., gray values) of one or more elements in the image. In some embodiments, the processing module 406 may transform the image based on one or more transformation techniques including, for example, grayscale transformation, weight transformation, image enhancement, etc.

The storage module 408 may store image data, control parameters, processed image data, or the like, or a combination thereof. In some embodiments, the storage module 408 may store one or more programs and/or instructions that may be executed by the processor(s) of the processing device 120 to perform exemplary methods described in this disclosure. For example, the storage module 408 may store program(s) and/or instruction(s) that can be executed by the processor(s) of the processing device 120 to acquire image data, reconstruct an image based on the image data, register two or more images, and/or display any intermediate result or a resultant image.

In some embodiments, one or more modules illustrated in FIG. 4 may be implemented in at least part of the exemplary imaging system 100 as illustrated in FIG. 1. For example, the acquisition module 402, the control module 404, the processing module 406, and/or the storage module 408 may be integrated into a console (not shown). Via the console, a user may set the parameters for scanning a subject, controlling imaging processes, controlling the parameters for image reconstruction, adjusting the parameters for registering multi-modality images, etc. In some embodiments, the console may be implemented via the processing device 120 and/or the terminal(s) 140.

Figure 5:
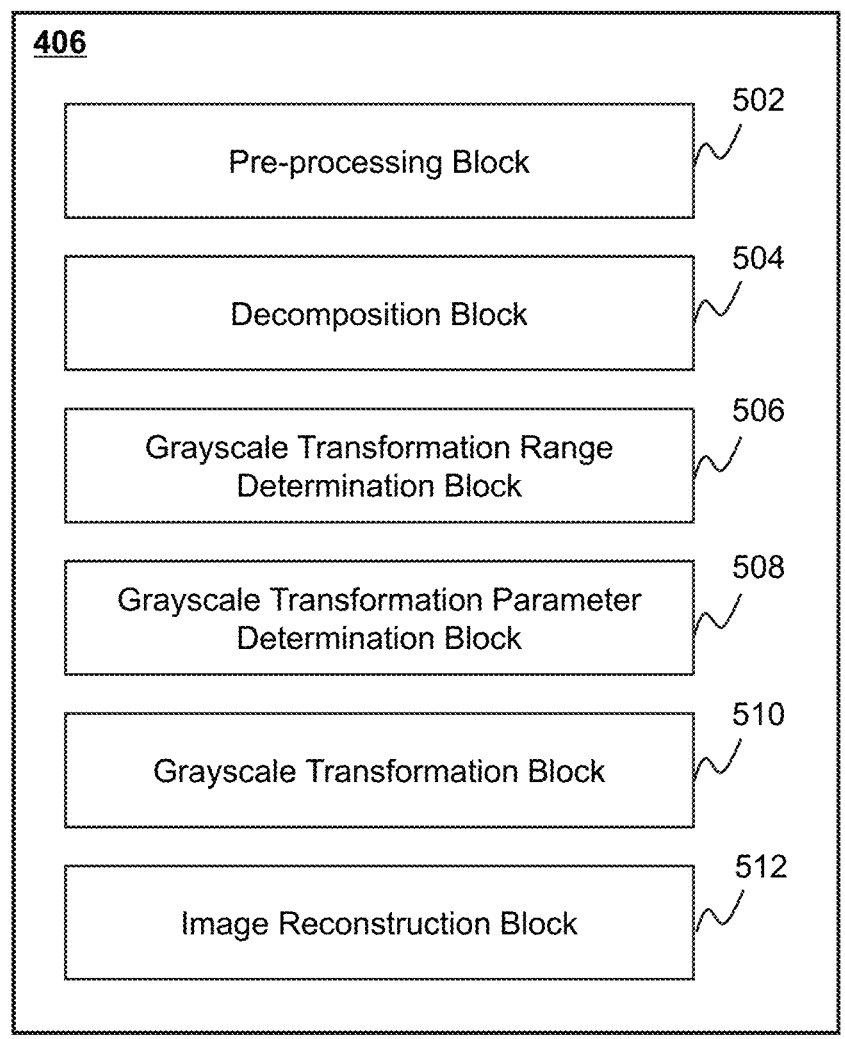
FIG. 5 is a block diagram illustrating an exemplary image processing module according to some embodiments of the present disclosure.

FIG. 5 is a block diagram illustrating an exemplary image processing module according to some embodiments of the present disclosure. The processing module 406 may include a pre-processing block 502, a decomposition block 504, a grayscale transformation range determination block 506, a grayscale transformation parameter determination block 508, a grayscale transformation block 510, and an image reconstruction block 512. At least a portion of the processing module 406 may be implemented on a computing device 200 as illustrated in FIG. 2 or a mobile device 300 as illustrated in FIG. 3.

The pre-processing block 502 may pre-process an image. In some embodiments, the pre-processing block 502 may perform pre-processing including, for example, image normalization, image smoothing, image suppressing, image encoding (or decoding), image denoising, etc. In some embodiments, the pre-processing block 502 may perform a logarithmic transformation and/or a segmentation on the image. For example, the pre-processing block 502 may segment an image to obtain a segmented image; then, the pre-processing block 502 may perform a logarithmic transformation on the segmented image to obtain a pre-processed image. As another example, the pre-processing block 502 may perform a logarithmic transformation on an image to obtain an intermediate image, and segment the intermediate image to obtain a segmented intermediate image, in which the segmented intermediate image is the pre-processed image.

The decomposition block 504 may decompose an image (e.g., a pre-processed image). In some embodiments, the decomposition block 504 may decompose an image into one or more images including, for example, a low-frequency image and/or a high-frequency image. In some embodiments, the decomposition block 504 may decompose an image into a low-frequency image and a high-frequency image based on one or more frequency thresholds. For example, the decomposition block 504 may determine a sub image with frequencies lower than or equal to a frequency threshold $T_f$ as the low frequency image. As another example, the decomposition block 504 may determine a sub image with frequencies greater than or equal to the frequency threshold $T_f$ as the high frequency image. The threshold $T_f$ may be predetermined according to a default setting of the imaging system 100 or determined by a user through the I/O 230 or I/O 350. In some embodiments, the threshold $T_f$ may be adjusted based on a processing efficiency of the image. In some embodiments, the decomposition block 504 may decompose the image by filtering the image based on a filtering algorithm. The filtering algorithm may include a bilateral filtering algorithm, a wavelet filtering algorithm, etc. The bilateral filtering algorithm may have an advantage of good detail retention. The wavelet filtering algorithm may have an advantage of wide range of applicability.

The grayscale transformation range determination block 506 may determine one or more grayscale transformation ranges. In some embodiments, a grayscale transformation range may include a maximal gray value, a minimal gray value, and a plurality of gray values between the maximal gray value and the minimal gray value. In some embodiments, the grayscale transformation range determination block 506 may determine a grayscale transformation range based on an image (e.g., a pre-processed image, a low-frequency image, a high-frequency image, etc.) and a grayscale distribution characteristic associated with the image. For example, the grayscale transformation range determination block 506 may determine a grayscale transformation range of a breast image based on a pre-processed breast image, a first grayscale distribution characteristic of gland in a low-frequency breast image, and a second grayscale distribution characteristic of fat in the low-frequency breast image. In some embodiments, the grayscale transformation range determination block 506 may determine a grayscale transformation range based on a transformation region in a low-frequency image. More descriptions of the grayscale transformation range determination block 506 may be found elsewhere in the present disclosure (e.g., FIG. 7 and the description thereof).

The grayscale transformation parameter determination block 508 may determine one or more grayscale transformation parameters. In some embodiments, a grayscale transformation parameter may include one or more grayscale transformation functions and one or more parameters associated therewith. In some embodiments, the grayscale transformation parameter determination block 508 may determine one or more grayscale transformation functions after the grayscale transformation range is determined. The grayscale transformation range may be used as a whole or may be divided into a plurality of grayscale transformation sub-ranges. In some embodiments, the grayscale transformation range may be divided based on experience or may automatically be divided according to gray values of the grayscale transformation range. In some embodiments, the grayscale transformation parameter determination block 508 may further determine a grayscale transformation line segment corresponding to each of the grayscale transformation sub-ranges. In some embodiments, the grayscale transformation parameter determination block 508 may obtain a transformation curve by performing a curve fitting on the grayscale transformation line segments. In some embodiments, parameters (e.g., one or more endpoints, one or more slopes, etc.) relating to the transformation curve may be designed as the grayscale transformation parameter(s). More descriptions of the grayscale transformation parameter determination block 508 may be found elsewhere in the present disclosure (e.g., FIG. 7 and the description thereof).

The grayscale transformation block 510 may transform the gray values of one or more elements in an image (e.g., a pre-processed image, a low-frequency image, a high-frequency image, etc.). In some embodiments, the grayscale transformation block 510 may transform gray values of one or more elements in the image to amplify or compress the gray values of the elements, improve the quality of the image, reduce noise, or the like. In some embodiments, the grayscale transformation block 510 may transform the gray values based on one or more grayscale transformation parameters determined by the grayscale transformation parameter determination block 508. More descriptions of the grayscale transformation block 510 may be found elsewhere in the present disclosure (e.g., FIG. 7 and the description thereof).

The image reconstruction block 512 may reconstruct an image. In some embodiments, the image reconstruction block 512 may generate a transformed image. In some embodiments, the image reconstruction block 512 may reconstruct an image based on two or more images. For example, the image reconstruction block 512 may generate a transformed image by reconstructing a transformed low-frequency image and a high-frequency image. In some embodiments, the image reconstruction block 512 may determine an element in the transformed image by adding up a first gray value of a first corresponding element in the transformed low-frequency sub-image and a second gray value of a second corresponding element in the high-frequency sub-image. More descriptions of the image reconstruction block 512 may be found elsewhere in the present disclosure (e.g., FIG. 7 and the description thereof).

It should be noted that the above description of the processing module 406 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the pre-processing block 502 and the decomposition block 504 may be integrated into a single block. As another example, the grayscale transformation range determination block 506, the grayscale transformation parameter determination block 508, and the grayscale transformation block 510 may be integrated into a single block.

Figure 6:
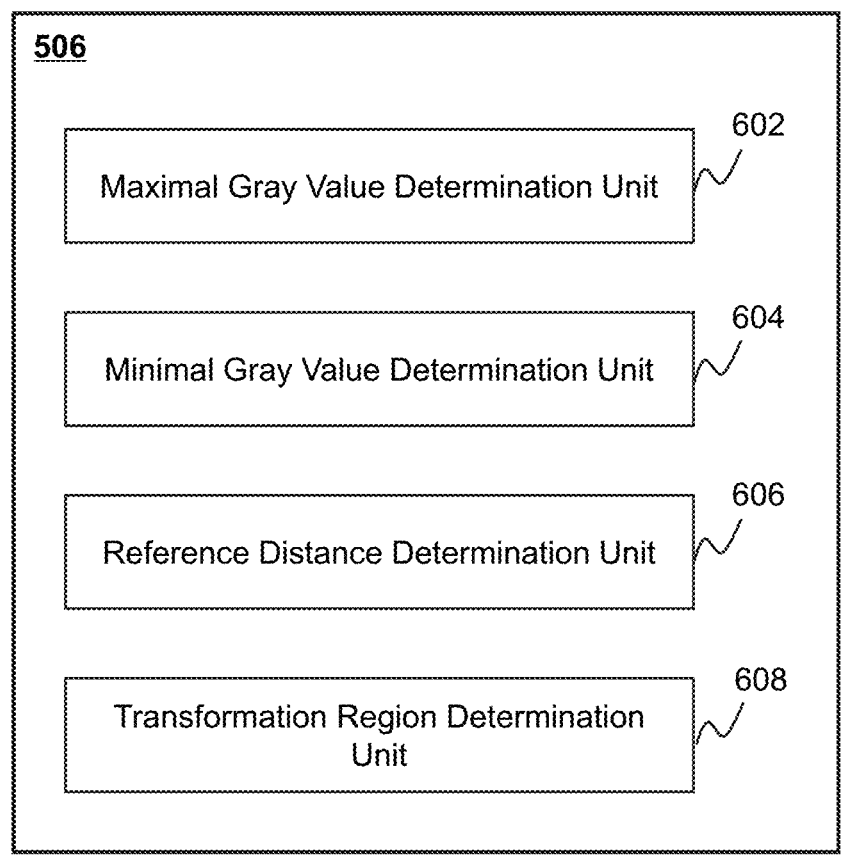
FIG. 6 is a block diagram illustrating an exemplary grayscale transformation range determination block according to some embodiments of the present disclosure.

FIG. 6 is a block diagram illustrating an exemplary grayscale transformation range determination block according to some embodiments of the present disclosure. The grayscale transformation range determination block 506 may include a maximal gray value determination unit 602, a minimal gray value determination unit 604, a reference distance determination unit 606, and a transformation region determination unit 608. At least a portion of the grayscale transformation range determination block 506 may be implemented on a computing device 200 as illustrated in FIG. 2 or a mobile device 300 as illustrated in FIG. 3.

The maximal gray value determination unit 602 may determine a maximal gray value. In some embodiments, the maximal gray value determination unit 602 may determine a maximal gray value based on a statistical grayscale feature of an image (e.g., a pre-processed image) or an image region where one or more elements having the maximal gray value are usually located in the image (e.g., the pre-processed image).

The minimal gray value determination unit 604 may determine a minimal gray value based on an image (e.g., a pre-processed image, a low-frequency image, a high-frequency image, etc.). For example, the minimal gray value determination unit 604 may generate a first low-frequency image by editing a low-frequency image; the minimal gray value determination unit 604 may determine a segmentation threshold; the minimal gray value determination unit 604 may segment the first low-frequency image based on the segmentation threshold; the minimal gray value determination unit 604 may determine a first grayscale mean value of gland in the low-frequency image based on the segmented first low-frequency image; the minimal gray value determination unit 604 may determine a second grayscale mean value of fat in the low-frequency image based on the segmented first low-frequency image; and the minimal gray value determination unit 604 may determine the minimal gray value based on the segmentation threshold, the first grayscale mean value, and the second grayscale mean value. More descriptions of the minimal gray value determination unit 604 may be found elsewhere in the present disclosure (e.g., FIG. 12 and the description thereof).

The reference distance determination unit 606 may determine a reference distance. In some embodiments, the reference distance may refer to a width of a non-compressed part of an organ (e.g., a breast). In some embodiments, the reference distance determination unit 606 may determine the reference distance based on a breast width, a compression thickness, and a predetermined distance determination model. More descriptions of the determination of the reference distance may be found elsewhere in the present disclosure (e.g., FIGS. 7 and 19, and the descriptions thereof).

The transformation region determination unit 608 may determine a transformation region. In some embodiments, the transformation region may refer to a target region of a low-frequency image, in which the grayscale of a plurality of elements may be transformed. In some embodiments, the transformation region determination unit 608 may determine the transformation region based on a width of an organ or tissue (e.g., a breast), a compression thickness of the organ or tissue (e.g., the breast), and/or a grayscale transformation distance determination model (also referred to as a distance determination model). In some embodiments, the transformation region determination unit 608 may determine a first edge and a second edge of a transformation region. In some embodiments, the transformation region determination unit 608 may determine the transformation region based on the first edge and the second edge. In some embodiments, the transformation region may be a region between the first edge and the second edge.

It should be noted that the above description of the grayscale transformation range determination block 506 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the maximal gray value determination unit 602 and the minimal gray value determination unit 604 may be integrated into a single unit. As another example, the maximal gray value determination unit 602 and/or the minimal gray value determination unit 604 may be unnecessary. As a further example, the reference distance determination unit 606 and the transformation region determination unit 608 may be integrated into a single unit. As still a further example, the reference distance determination unit 606 and/or the transformation region determination unit 608 may be unnecessary.

Figure 7:
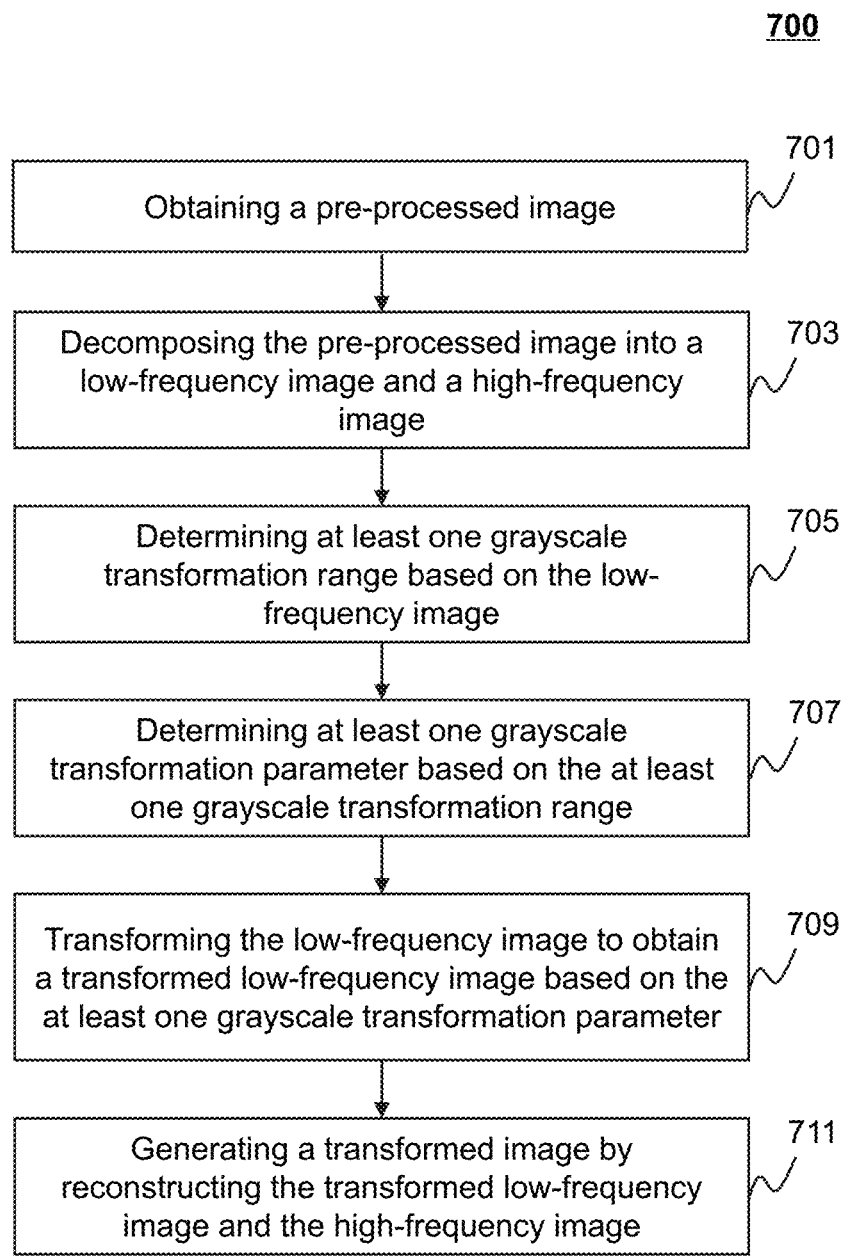
FIG. 7 is a flowchart illustrating an exemplary process for transforming an image according to some embodiments of the present disclosure.

FIG. 7 is a flowchart illustrating an exemplary process for transforming an image according to some embodiments of the present disclosure. The process 700 may be performed by an image processing device integrated into an imaging system (e.g., the imaging system 100 as illustrated in FIG. 1), which can be implemented in software and/or hardware. For example, the process 700 may be stored in the storage device 130 and/or the storage 220 as a form of instructions (e.g., an application), and invoked and/or executed by the processing device 120 (e.g., the processor 210 illustrated in FIG. 2, or one or more modules in the processing device 120 illustrated in FIG. 4). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

The image to be transformed may be a medical image of a specific portion, organ, and/or a tissue of an object (e.g., a patient). In the present disclosure, a breast image may be taken as an example in the following descriptions for purposes of illustration. The image processing device may be integrated into a mammography imaging system (e.g., the imaging system 100 as illustrated in FIG. 1), such as a breast xeroradiography system, a film-screen mammography system, a full-field digital mammography (FFDM) system, etc.

In 701, the acquisition module 402 may acquire a pre-processed image. In some embodiments, the acquisition module 402 may acquire the pre-processed image from the storage device 130, and/or the terminal 140 of the imaging system 100. In some embodiments, the acquisition module 402 may acquire the pre-processed image from the I/O 230 of the computing device 200 via the communication port 240, and/or the I/O 350 of the mobile device 300 via the communication platform 310. Alternatively, the pre-processed image may be acquired from an external data source connected to the imaging system 100 via the network 150.

The pre-processed image may refer to an image generated by one or more pre-processing operations performed on an initial image. The initial image may be generated based on raw image data collected by the scanner 110. In some embodiments, the pre-processing operations may be implemented by the pre-processing block 502. For example, the pre-processed breast image may be obtained by pre-processing an initial breast image, so that the complexity and amount of computation in one or more further operations for transformation may be reduced.

Figure 8:
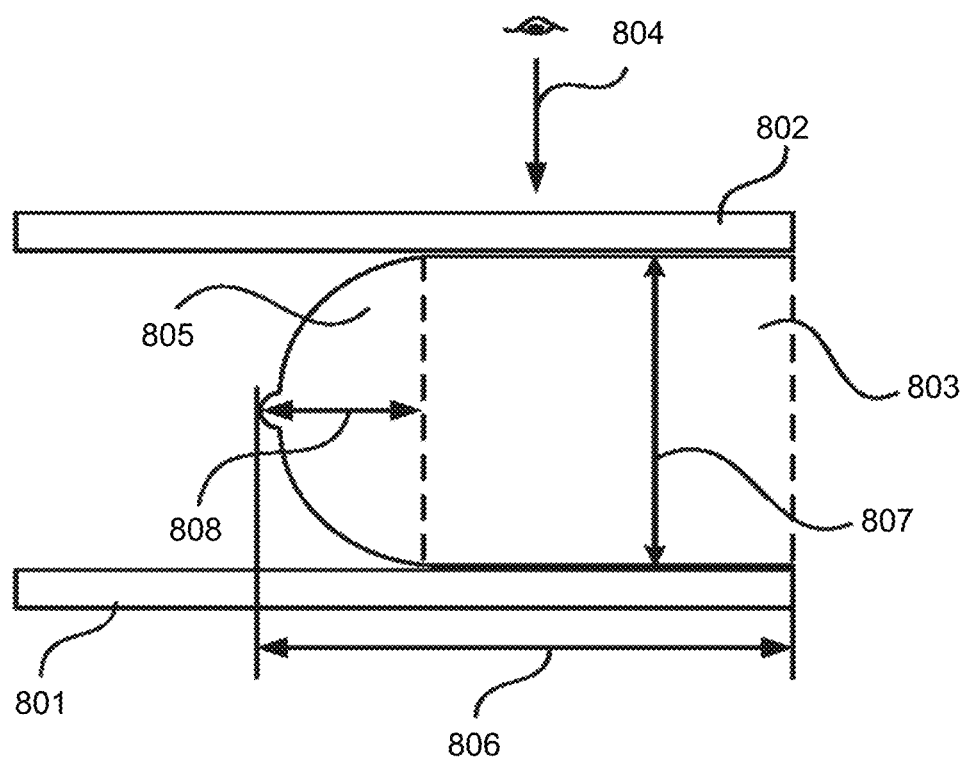
FIG. 8 is a schematic diagram of a compressed breast according to some embodiments of the present disclosure.
Figure 9:
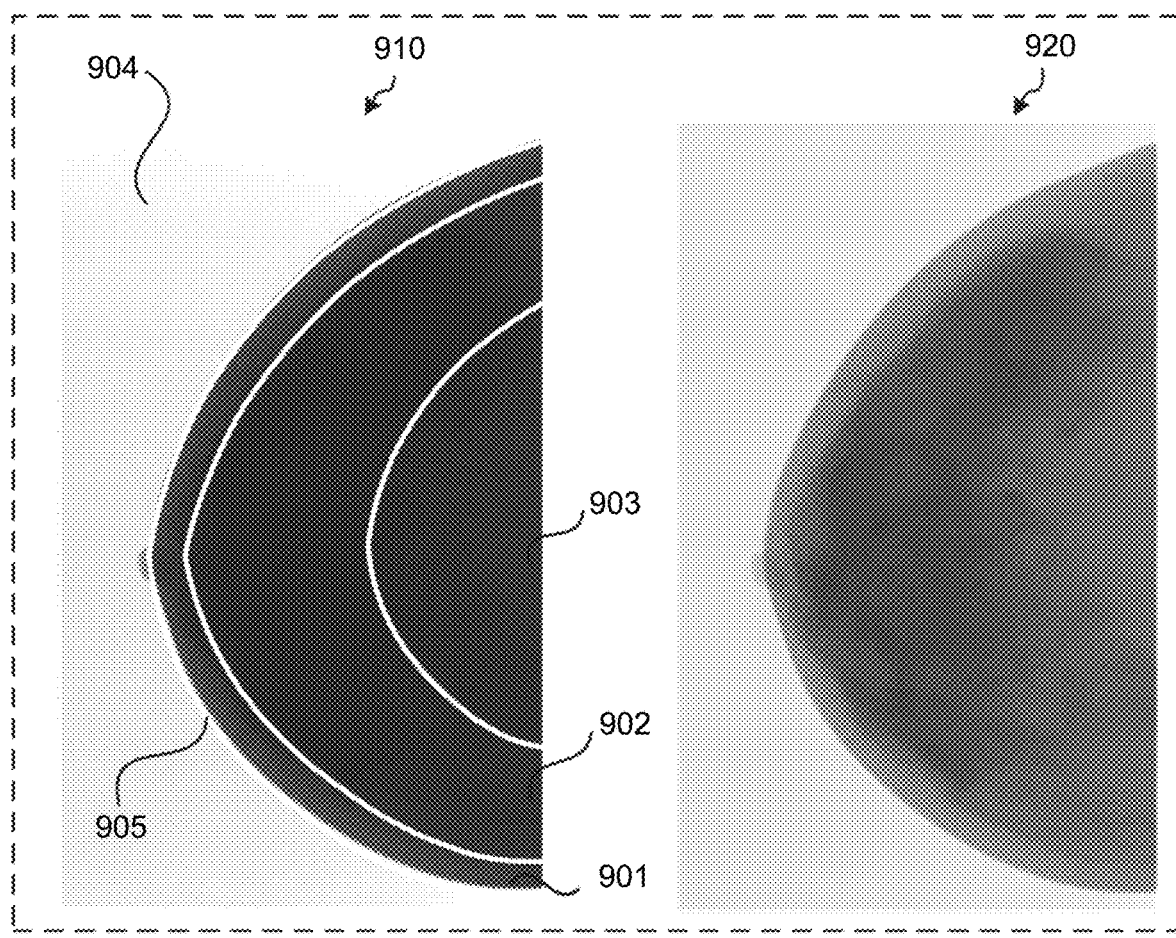
FIG. 9 is a schematic diagram of an initial breast image and a LOG breast image according to some embodiments of the present disclosure.

In some embodiments, the initial breast image may be generated by the imaging system 100 (e.g., a breast xeroradiography system, a film-screen mammography system, a full-field digital mammography (FFDM) system, etc.). An exemplary initial breast image is shown in FIG. 9. As illustrated in FIGS. 8 and 9, the initial breast image 910 of a breast 803 may be photographed from an angle of view 804 by compressing the breast 803 with a support plate 801 and a compression plate 802 by an FFDM system. When the breast 803 is compressed, an edge region 805 close to a contour of the breast 803 may not be well compressed due to one or more factors (e.g., a force level of the compression, an angle of the compression, etc.), resulting in that a thickness of the breast 803 may be not uniform and a grayscale distribution of the initial breast image 910 is non-uniform. As further illustrated in FIG. 9, a middle breast region 902 may be darker than a breast edge region 901 close to the contour 905 of the breast and/or a breast root region 903, and a grayscale of the breast edge region 901 may be similar to that of a background region 904. The initial breast image 910 may be not suitable for the diagnosis of breast diseases. Therefore, the thickness of the initial breast image 910 may need to be equalized based on one or more transformation processes (e.g., a grayscale transformation), so that a transformed breast image may meet the needs of clinical diagnosis.

In some embodiments, the pre-processing operation may include a logarithmic transformation, segmentation, denoising, etc. In some embodiments, the pre-processing block 502 may perform a logarithmic transformation on the initial image (e.g., the initial breast image 910) to obtain the pre-processed image (e.g., the pre-processed breast image). The logarithmic transformation may be performed for transforming an image into another image in a logarithmic (LOG) domain (i.e., a LOG image). For example, the pre-processing block 502 may perform the logarithmic transformation on the initial breast image 910 based on a characteristic that the X-ray attenuation obeys an exponential distribution. The initial breast image 910 may be transformed into a breast image in a LOG domain (i.e., a LOG breast image 920 shown in FIG. 9).

Figure 11:
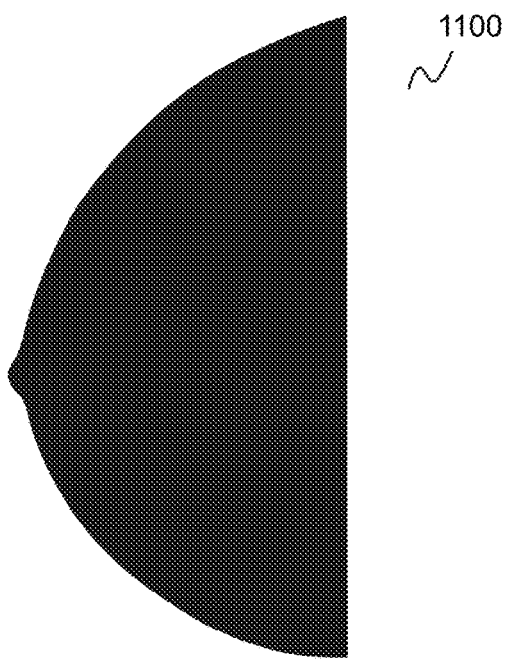
FIG. 11 is a schematic diagram of an exemplary mask image for segmenting an image including a breast according to some embodiments of the present disclosure.

The segmentation operation may be performed for segmenting an image and extract a region of interest (e.g., a portion excluding a background region of the image). In some embodiments, the segmentation operation may be performed based on one or more mask images. A mask image may be a binary image including a first set of elements with value "0" and a second set of elements with value "1." An element may be a pixel or voxel. In an exemplary segmentation operation, elements of a target image (e.g., the initial image, the low-frequency image, etc.) corresponding to the first set of elements with value "0" or the second set of elements with value "1" of the mask image may be extracted and retained in a segmented image, while the other elements of the target image may be removed. An exemplary mask image is shown in FIG. 11. In some embodiments, the mask image may be determined based on the initial image (e.g., the initial breast image 910 in FIG. 9). In some embodiments, the mask image may be obtained by segmenting the initial image (e.g., by automatic segmentation, edge detection, etc.). For example, one or more non-mask regions (e.g., a direct exposure area (e.g., the background region), a chest wall area, an implant area, or the like) may be removed from the initial image through segmentation, so that the mask image may not include the non-mask region(s).

In some embodiments, the segmentation operation may be performed before or after the logarithmic transformation operation. For example, the pre-processing block 502 may segment the initial image (e.g., the initial breast image 910) to obtain a segmented image (e.g., a segmented breast image) based on the mask image shown in FIG. 11. Then, the pre-processing block 502 may perform a logarithmic transformation on the segmented image (e.g., the segmented breast image) to obtain the pre-processed image. The segmented breast image may include only the region having breast tissue without a direct exposure area (e.g., the background region), a chest wall area, an implant area, or the like. As another example, the pre-processing block 502 may perform a logarithmic transformation on the initial image to obtain an intermediate image (e.g., a LOG breast image), and segment the intermediate image to obtain a segmented intermediate image, in which the segmented intermediate image is the pre-processed image.

In 703, the decomposition block 504 may decompose the pre-processed image into a low-frequency image and a high-frequency image. In some embodiments, the decomposition block 504 may decompose the pre-processed image into the low-frequency image (e.g., the low-frequency image 1001 in FIG. 10) and the high-frequency image (e.g., the high-frequency image 1002 in FIG. 10) by filtering the pre-processed image based on a filtering algorithm. The filtering algorithm may include a bilateral filtering algorithm, a wavelet filtering algorithm, etc. The bilateral filtering algorithm may have an advantage of good detail retention. The wavelet filtering algorithm may have an advantage of wide range of applicability. The low-frequency image may determine an overall shape (or overall grayscale) of the pre-processed image. The high-frequency image may determine details of the pre-processed image. In some embodiments, the low-frequency image may be used in the subsequent grayscale transformation, so that the contrast of the pre-processed image may be adjusted while details of the pre-processed image may be not affected.

Figure 10:
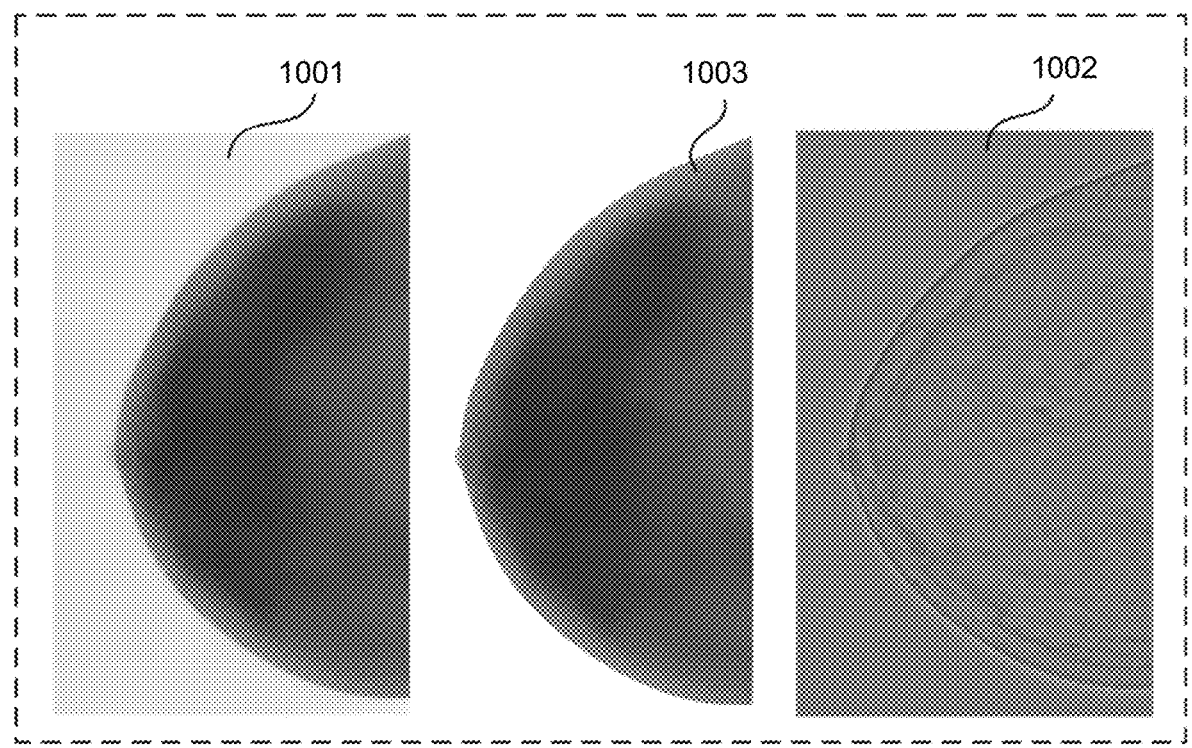
FIG. 10 is a schematic diagram of a low-frequency image and a high-frequency image according to some embodiments of the present disclosure.

In some embodiments, the decomposition operation may be performed before the segmentation operation. As illustrated in FIG. 10, the decomposition block 504 may decompose an intermediate image (e.g., a LOG breast image 920) into a low-frequency image 1001 and a high-frequency image 1002. The pre-processing block 502 may then segment the low-frequency image 1001 to obtain a low-frequency breast image 1003. The low-frequency breast image 1003 may be used in the subsequent transformation. If the decomposition operation is performed before the segmentation operation, the low-frequency image and/or the high-frequency image may include a background region. If the decomposition operation is performed after the segmentation operation, the low-frequency image and/or the high-frequency image may not include a background region.

In 705, the grayscale transformation range determination block 506 may determine at least one grayscale transformation range based on the low-frequency image excluding the background region. In some embodiments, the grayscale transformation range determination block 506 may determine the at least one grayscale transformation range based on the pre-processed image, a first grayscale distribution characteristic of gland in the low-frequency image, and a second grayscale distribution characteristic of fat in the low-frequency image.

In some embodiments, the grayscale transformation range may include a maximal gray value and a minimal gray value. In some embodiments, the maximal gray value determination unit 602 may determine the maximal gray value. The maximal gray value may be determined based on a statistical grayscale feature of the pre-processed image or an image region where one or more elements having the maximal gray value are usually located in the pre-processed image. In some embodiments, gray values of the elements on the breast edge close to the contour in the pre-processed image may be generally greater than those of other regions thereof. In some embodiments, a maximal gray value of the elements on the breast contour 905 may be designated as the maximal gray value of the grayscale transformation range. In some embodiments, the maximal gray value may be determined based on the pre-processed image including or excluding the background region. The minimal gray value may be determined based on the first grayscale distribution characteristic of gland in the low-frequency image and the second grayscale distribution characteristic of fat in the low-frequency image. More descriptions of the determination of the minimal gray value may be found elsewhere in the present disclosure (e.g., FIG. 12 and the description thereof).

In some embodiments, the grayscale transformation range determination block 506 may determine the at least one grayscale transformation range based on a transformation region in the low-frequency image. The transformation region may refer to a target region of the low-frequency image, in which the grayscale of a plurality of elements may be transformed. The transformation region may be determined based on a width of an organ or tissue (e.g., a breast), a compression thickness of the organ or tissue (e.g., the breast), and/or a grayscale transformation distance determination model (also referred to as a distance determination model).

In some embodiments, the breast width may refer to the widest width of the breast in the low-frequency image. In some embodiments, a maximal value of a vertical distance (also referred to as a maximal distance) from a breast contour to an image edge opposite to the breast contour. As shown in FIG. 8, a breast width 806 may correspond to the vertical distance from the nipple to the image edge opposite to the breast contour. In some embodiments, the transformation region may be determined based on the breast width 806.

The compression thickness of the organ or tissue (e.g., the breast) may refer to a thickness of a part of the compressed organ or tissue that contacts with a compression plate when the organ or tissue is imaged. As shown in FIG. 8, a breast compression thickness 807 may correspond to the thickness of the part of the compressed breast 803 that contacts with the compression plate 802. The breast compression thickness 807 may be acquired based on the imaging parameters that are used in imaging of the breast by the imaging system 100.

The distance determination model may be a statistical model or an intelligent algorithm model (e.g., a machine learning model). In some embodiments, the distance determination model may be a predetermined model or function. In some embodiments, a predetermined intelligent algorithm model may be determined according to training data and may be used for determining a grayscale transformation distance (also referred to as a reference distance). In some embodiments, the reference distance may refer to a width of a non-compressed part of the organ. For example, as shown in FIG. 8, the edge region 805 close to the contour of the breast 803 is not in contact with the compression plate 802 and the support plate 801, and a width 808 of the edge region 805 may be designated as the reference distance.

In some embodiment, an exemplary distance determination model may be predetermined based on one or more of the following operations: at least two sets of historical breast images and historical breast compression thicknesses corresponding to the historical breast images may be acquired; historical breast widths and historical reference distances may be determined according to the historical breast images; the historical breast widths, the historical breast compression thicknesses, and/or the historical reference distances may be designated as training data; and the distance determination model may be determined by training an initial model with the training data. More descriptions of the determination of the at least one grayscale transformation range based on a transformation region in the low-frequency image may be found elsewhere in the present disclosure (e.g., FIGS. 17 and 19, and the descriptions thereof).

In 707, the grayscale transformation parameter determination block 508 may determine at least one grayscale transformation parameter based on the at least one grayscale transformation range. In some embodiments, a grayscale transformation parameter may include one or more grayscale transformation functions and one or more parameters associated therewith.

In some embodiments, the grayscale transformation parameter determination block 508 may determine one or more grayscale transformation functions after the at least one grayscale transformation range is determined. The at least one grayscale transformation range may be used as a whole or may be divided into a plurality of grayscale transformation sub-ranges. In some embodiments, the grayscale transformation range may be divided based on experience or may automatically be divided according to gray values of the grayscale transformation range. For example, the grayscale transformation range may be equally divided based on the gray values thereof. As another example, the grayscale transformation range may be divided according to gray values of elements with different distances to a breast contour (e.g., the breast contour 905 shown in FIG. 9). In some embodiments, the grayscale transformation function corresponding to each grayscale transformation range or sub-range may be linear or non-linear. In some embodiments, exemplary grayscale transformation parameter(s) may be determined based on one or more of the following operations: the grayscale transformation range may be divided into N grayscale transformation sub-ranges, in which N may be a positive integer; a grayscale transformation line segment corresponding to each of the grayscale transformation sub-ranges may be determined; and a curve fitting may be performed on N grayscale transformation line segments to obtain the grayscale transformation parameter.

Merely by way of example, the grayscale transformation range may be divided into N grayscale transformation sub-ranges based on a characteristic curve of the low-frequency image. The characteristic curve may be determined based on the grayscale transformation range. The characteristic curve may illustrate a relationship between a plurality of distances and a plurality of gray values. Each distance may refer to a minimal distance of each element (e.g., pixel or voxel) of the low-frequency image that has a gray value within the grayscale transformation range to a reference edge (e.g., a breast contour). For instance, if an element is connected by a line with each element on the reference edge, a plurality of lines with different lengths may be determined, and a minimal length of the plurality of lines may be designated as the minimum distance for the element.

In some embodiments, the maximal value of the grayscale transformation range may correspond to a gray value of a certain element on the breast contour, and the minimal value of the grayscale transformation range may correspond to a gray value of one or more candidate elements in the breast region. The grayscale transformation parameter determination block 508 may determine a corresponding element whose minimum distance to the breast contour is the largest among the candidate elements. In some embodiments, the elements between the corresponding element and the breast contour may be traversed, so that the minimum distances of the elements having gray values within the grayscale transformation range between the corresponding element and breast contour may be obtained.

In some embodiments, there may be more than one element having the same minimum distance, and a gray value corresponding to the minimum distance may be obtained by taking a mean gray value of the elements. Therefore, a plurality of minimum distances and corresponding gray values thereof may be obtained, and the characteristic curve (also referred to as a distance-grayscale curve) may be established by taking the minimum distances as the abscissa and the corresponding gray values as the ordinate. In some embodiments, the characteristic curve may be determined based on one or more of the following operations: a reference edge (e.g., a breast contour) may be determined in the low-frequency image; a plurality of distances (e.g., the minimum distances) between a plurality of elements in the low-frequency image and the reference edge may be determined; a plurality of mean gray values corresponding to the plurality of distances may be determined; and the characteristic curve may be determined based on the plurality of mean gray values and the plurality of distances. In some embodiments, the plurality of mean gray values corresponding to the plurality of distances may be determined based on one or more of the following operations: one or more gray values corresponding to one or more elements of the plurality of elements may be determined in the low-frequency image, in which the one or more elements may have a same distance (e.g., a same minimum distance); and a mean gray value of the plurality of mean gray values may be determined based on the one or more gray values.

It should be noted that the characteristic curve may be a discrete curve with a limited range of abscissa. The minimum value of the abscissa may be the minimum distance of a certain element corresponding to the maximal gray value of the grayscale transformation range. Accordingly, the maximum value of the abscissa may be the minimum distance of a certain element corresponding to the minimal gray value of the grayscale transformation range. The number of the abscissa values between the minimum value and the maximum value of the abscissa may be a finite number rather than an infinite number of consecutive values. In some embodiments, according to the characteristic curve, there may be a finite number of gray values (assuming that there are N) between the maximum value and the minimum value of the abscissa, and the grayscale transformation range may be divided into corresponding N grayscale transformation sub-ranges. More descriptions of the characteristic curve may be found in U.S. patent application Ser. No. 15/638,327 entitled "METHODS AND SYSTEMS FOR IMAGE PROCESSING," filed Jun. 29, 2017, which is expressly incorporated herein to its entirety.

In some embodiments, the grayscale transformation parameter determination block 508 may further determine a grayscale transformation line segment corresponding to each of the grayscale transformation sub-ranges. In some embodiments, a slope of each of the line segments may be predetermined based on one or more default values. In some embodiments, the slope of each of the line segments may be determined according to an upper limit and a lower limit of each grayscale transformation sub-range and/or the grayscale transformation range. For example, the slope may be determined as the quotient of twice the minimum value of the grayscale transformation range and a sum of the upper limit and the lower limit of each grayscale transformation sub-range. After the slope is determined, a function may be further determined for expressing the line segment. For a first line segment, the start point of the first line segment may correspond to the upper limit or the lower limit of the grayscale transformation range, and a function for the first line segment may be directly determined based on the endpoint and the slope. Accordingly, the start point of a subsequent line segment may be an endpoint of a previously determined line segment. The endpoint value may be calculated based on the function of the previously determined line segment and the grayscale transformation sub-range corresponding to the previously determined line segment. Similarly, the function for each of the line segments may be determined.

In some embodiments, the plurality of line segments may form a transformation curve. The transformation curve may indicate a relationship between a gray value before a transformation (also referred to as the first gray value) and the gray value after the transformation (also referred to as the second gray value).

In some embodiments, the grayscale transformation parameter determination block 508 may obtain the transformation curve by performing a curve fitting on all of the corresponding grayscale transformation line segments. The curve fitting algorithm may include a least square algorithm, a Lagrange interpolation algorithm, a Newton iteration algorithm, a cubic spline interpolation, etc. In some embodiments, parameters (e.g., one or more endpoints, one or more slopes, etc.) relating to the transformation curve may be designed as the grayscale transformation parameters. Since the transformation curve is obtained by a curve fitting, possible grayscale jumping may be reduced in a transformed low-frequency image that is obtained by grayscale transformation based on the transformation curve. Therefore, the grayscale distribution in the transformed low-frequency image may be more continuous and smoother.

In 709, the grayscale transformation block 510 may transform the low-frequency image to obtain a transformed low-frequency image based on the at least one grayscale transformation parameter. In some embodiments, the transformed low-frequency image may have a uniform thickness (or grayscale distribution) compared with the low-frequency image. The transformation may be performed based on the at least one grayscale transformation parameter. In some embodiments, the gray values of one or more elements in the low-frequency image may be updated based on the at least one grayscale transformation parameter. In some embodiments, the gray values of elements whose gray values are within the at least one grayscale transformation range may be updated based on the at least one grayscale transformation parameter. In some embodiments, according to the at least one grayscale transformation parameter, the gray values may be compressed linearly or non-linearly. More descriptions of the grayscale transformation may be found in U.S. patent application Ser. No. 15/638,327 entitled "METHODS AND SYSTEMS FOR IMAGE PROCESSING," filed Jun. 29, 2017, which is expressly incorporated herein to its entirety.

In 711, the image reconstruction block 512 may generate a transformed image by reconstructing the transformed low-frequency image and the high-frequency image. In some embodiments, each element in the transformed image may be determined by adding up a first gray value of a first corresponding element in the transformed low-frequency sub-image and a second gray value of a second corresponding element in the high-frequency sub-image. The breast in the transformed image may have a more uniform thickness compared with that in the pre-processed image. More descriptions of the reconstruction may be found in U.S. patent application Ser. No. 15/638,327 entitled "METHODS AND SYSTEMS FOR IMAGE PROCESSING," filed Jun. 29, 2017, which is expressly incorporated herein to its entirety.

It should be noted that the above description of the process 700 is merely provided for illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in process 700.

FIG. 8 is a schematic diagram of a compressed breast according to some embodiments of the present disclosure. The support plate 801 and the compression plate 802 may be configured to compress the breast 803 for imaging from the angle of view 804. When the breast 803 is compressed, an edge region 805 of the breast 803 may not be well compressed, so that the grayscale distribution of the breast image generated based on the compressed breast may be non-uniform.

FIG. 9 is a schematic diagram of an initial breast image 910 and a LOG breast image 920 according to some embodiments of the present disclosure. The initial breast image 910 includes an edge region 901, which is close to a breast contour 905. The initial breast image 910 also includes a middle breast region 902, a breast root region 903, a background region 904, etc. The LOG breast image 920 was obtained by performing a logarithmic transformation on the initial breast image 910.

FIG. 10 is a schematic diagram of a low-frequency image 1001 and a high-frequency image 1002 according to some embodiments of the present disclosure. The low-frequency image 1001 and the high-frequency image 1002 are obtained by filtering a pre-processed image based on a filtering algorithm. The low-frequency image 1001 is further segmented, and a low-frequency breast image 1003 is obtained.

FIG. 11 is a schematic diagram of an exemplary mask image for segmenting an image including a breast according to some embodiments of the present disclosure. Using the mask image 1100, a background region may be removed from a breast image. For example, the low-frequency breast image 1003 was obtained by segmenting the low-frequency image 1001 based on the mask image 1100.

Figure 12:
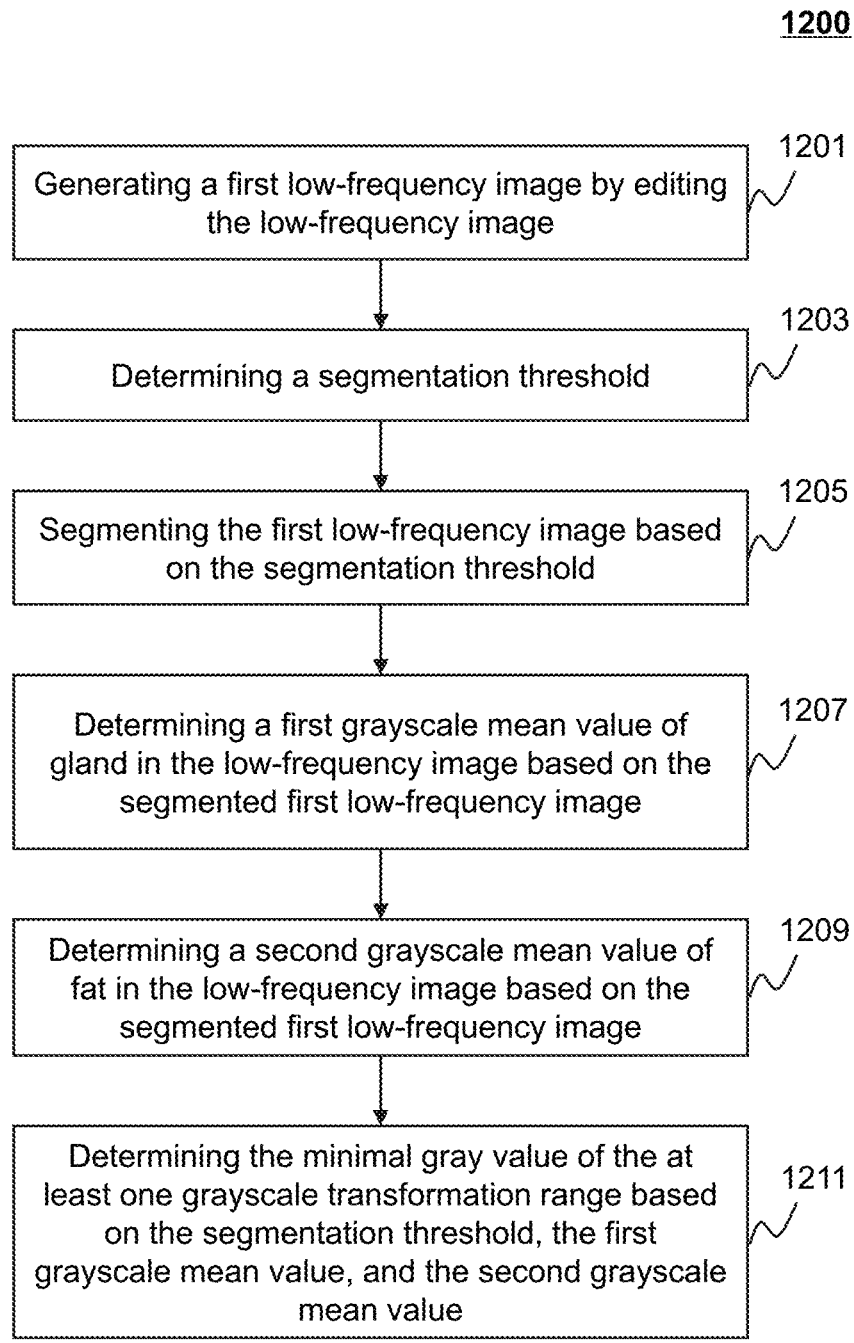
FIG. 12 is a flowchart illustrating an exemplary process for determining a minimal gray value of the at least one grayscale transformation range according to some embodiments of the present disclosure.

FIG. 12 is a flowchart illustrating an exemplary process for determining a minimal gray value of the at least one grayscale transformation range according to some embodiments of the present disclosure. The process 1200 may be performed by an image processing device integrated into an imaging system (e.g., the imaging system 100 as illustrated in FIG. 1), which can be implemented in software and/or hardware. For example, the process 1200 may be stored in the storage device 130 and/or the storage 220 as a form of instructions (e.g., an application), and invoked and/or executed by the processing device 120 (e.g., the processor 210 illustrated in FIG. 2, or one or more modules in the processing device 120 illustrated in FIG. 4). The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting. Herein a breast image may be taken as an example in the following descriptions for the purposes of illustration.

In 1201, the minimal gray value determination unit 604 may generate a first low-frequency image by editing the low-frequency image. In some embodiments, the low-frequency image to be edited may not include a background region, which is referred to herein as a low-frequency breast image. In some embodiments, the editing operation may be performed to remove, from the low-frequency image, one or more elements whose gray values are relatively low (or relatively high) and become an instability factor affecting the determination of the grayscale transformation range. In some embodiments, the editing operation may include acquiring a grayscale histogram or a cumulative grayscale histogram of the low-frequency breast image. Then a certain percentage of the top and/or bottom portion may be removed from the grayscale histogram or the cumulative grayscale histogram. For example, a portion whose cumulative frequency is smaller than 5% or greater than 95% may be removed from the cumulative grayscale histogram. In some embodiments, the editing operation may include clipping or removing a specific portion of the low-frequency breast image according to experience or characteristics of the low-frequency breast image. For example, a portion with certain width from one side of the breast contour may be removed from the low-frequency breast image according to individual differences in breasts.

In some embodiments, the first low-frequency image may be generated based on one or more of the following operations: a width of a target organ (e.g., the breast) may be determined based on the low-frequency (breast) image; the low-frequency (breast) image may be edited by clipping the low-frequency (breast) image based on the width of the target organ to obtain a second low-frequency image; and the first low-frequency image may be generated by editing a histogram of the second low-frequency image.

In some embodiments, the width of the breast (also referred to as the breast width) may be determined based on one or more of the following operations: a third low-frequency image may be determined; a maximal distance may be determined between a contour of the target organ (e.g., the breast contour) and an edge of the third low-frequency image opposite to the contour of the target organ. In some embodiments, the third low-frequency image may be determined by removing a first predetermined region of the low-frequency (breast) image or by extracting a second predetermined region of the low-frequency (breast) image from the image. In some embodiments, the first predetermined region may include a non-target organ (e.g., a non-breast organ like an arm). In some embodiments, the second predetermined region may include at least a portion of the target organ (e.g., the breast).

Figure 13:
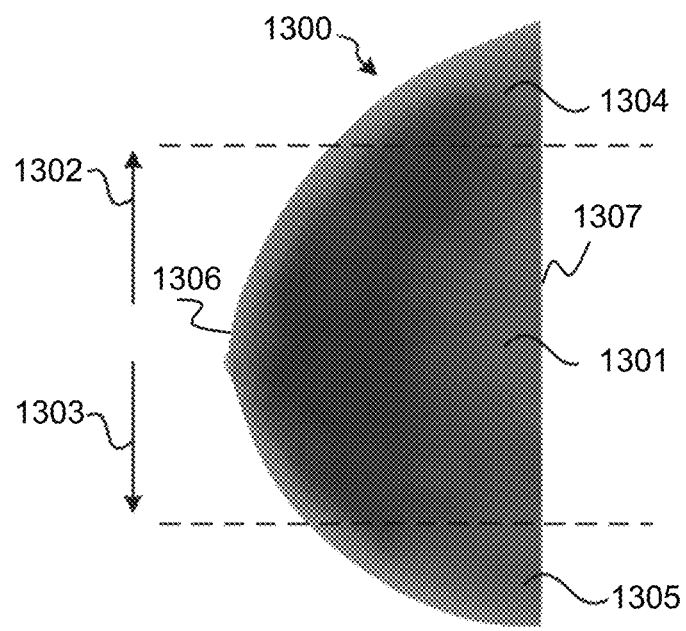
FIG. 13 is a schematic diagram of a low-frequency image according to some embodiments of the present disclosure.

FIG. 13 is a schematic diagram of a low-frequency image according to some embodiments of the present disclosure. As illustrated in FIG. 13, a low-frequency breast image 1300 includes a third low-frequency image 1301. In some embodiments, the third low-frequency image 1301 may be obtained by removing a first portion 1304 and a second portion 1305. The first portion 1304 may have a predetermined proportion (e.g., ⅙) of the low-frequency breast image 1300 along a first predetermined direction 1302. The second portion 1305 may have a predetermined proportion (e.g., ⅙) of the low-frequency breast image 1300 along a second predetermined direction 1303. In some embodiments, the third low-frequency image 1301 may be obtained by extracting a predetermined region starting from a nipple part of the low-frequency breast image 1300 and extending a predetermined proportion (e.g., ⅓) along the first predetermined direction 1302 and the second predetermined direction 1303 separately. In some embodiments, the first predetermined direction 1302 and the second predetermined direction 1303 may coincide with an extending direction of the image edge away from the breast contour. In some embodiments, the first predetermined region (e.g., the first portion 1304 and the second portion 1305) to be removed and the second predetermined region (e.g., the region corresponding to the third low-frequency image 1301) to be extracted may be determined based on clinical experience. According to the third low-frequency image 1301, the maximal distance between the breast contour 1306 and an edge 1307 of the third low-frequency image 1301 opposite to the breast contour 1306 may be determined as the breast width.

In some embodiments, the low-frequency (breast) image may be edited by clipping the low-frequency (breast) image based on the width of the breast to obtain a second low-frequency image. In some embodiments, the second low-frequency image may be determined by clipping the low-frequency (breast) image to remove a portion with a clipping width. The clipping width may be determined based on a predetermined relationship between the breast width and the clipping width. The predetermined relationship may express a proportional relation between the breast width and the clipping width. Based on the proportional relation, an empirical clipping width may be determined in consideration of the individual differences of breasts. In some embodiments, the predetermined relationship may be an empirical function obtained based on clinical experience, as illustrated in Equation (1):

$$W_c/W_r = W_t/N_t, \tag{1}$$

where $W_c$ represents a clipping width to be determined, $W_r$ represents the breast width acquired according to the low-frequency breast image, $W_t$ represents an empirical breast width obtained by statistical analysis, and $N_t$ is an empirical number.

In some embodiments, $W_c$, $W_r$, and $W_t$ may have the same width unit. In some embodiments, the widths $W_c$, $W_r$, and $W_t$ may be represented by a number of elements in a unit of number thereof. In some embodiments, the widths $W_c$, $W_r$, and $W_t$ may be represented by a width in a unit of a centimeter. In some embodiments, the unit of $N_t$ may be the same as the widths $W_c$, $W_r$, and/or $W_t$. For example, if the unit of the widths $W_c$, $W_r$, and $W_t$ are a number of elements, $N_t$ may refer to an empirical number of elements. In some embodiments, the value of $N_t$ may relate to a resolution of the low-frequency (breast) image. For example, if $W_t$ is 1.5 cm, $N_t$ is 1000, and each element has a size of 0.085 mm, then the number of elements corresponding to 1.5 cm is about 170, $W_t$ is 170, and the clipping width $W_c$ may be $(170 \ast W_r)/1000$.

Figure 14:
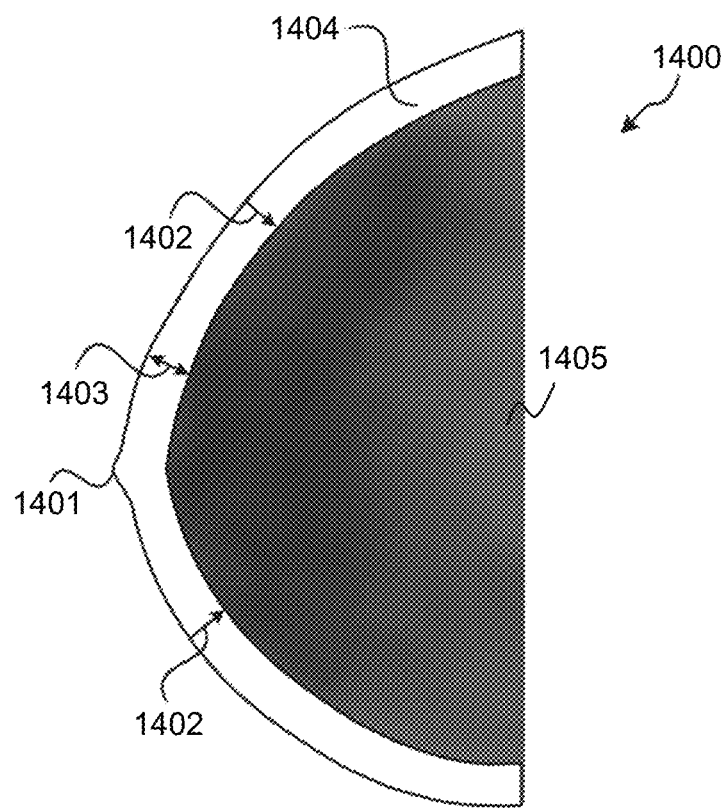
FIG. 14 is a schematic diagram of a low-frequency image according to some embodiments of the present disclosure.

FIG. 14 is a schematic diagram of a low-frequency image according to some embodiments of the present disclosure. As illustrated in FIG. 14, the shape of a clipping region 1404 is similar to the breast contour 1401. The clipping region 1404 may be determined by extending the breast contour 1401 of the low-frequency breast image 1400, along a radial direction 1402 of the breast contour 1401, to the inside of the breast region by a distance of the clipping width 1403. Therefore, the second low-frequency image 1405 may be obtained by clipping the clipping region 1404 from the low-frequency breast image 1400.

In some embodiments, the first low-frequency image may be determined by editing a histogram of the second low-frequency image. In some embodiments, the minimal gray value determination unit 604 may obtain a grayscale histogram of the second low-frequency breast image. In some embodiments, the grayscale histogram of the second low-frequency breast image may be truncated. For example, a predetermined proportion may be removed from a side of the grayscale histogram to obtain a clipped histogram. In some embodiments, the predetermined proportion of the grayscale histogram may have relatively low gray values. In some embodiments, the predetermined proportion may be determined as, for example, a value between 1% and 3%. Since the grayscale histogram of the second low-frequency breast image is truncated, one or more elements whose gray values are within the removed proportion may be removed from the second low-frequency image, and thus the first low-frequency image corresponding to the clipped histogram may be obtained.

In 1203, the minimal gray value determination unit 604 may determine a segmentation threshold. The segmentation threshold may be a grayscale boundary of the fat and gland in the first low-frequency (breast) image. In some embodiments, the segmentation threshold may be determined based on an OTSU algorithm. For example, the grayscale histogram of the first low-frequency (breast) image may be processed based on the OTSU algorithm to obtain the segmentation threshold. In some embodiments, the segmentation threshold may be expressed as "f_Divide."

In 1205, the minimal gray value determination unit 604 may segment the first low-frequency image based on the segmentation threshold. In some embodiments, the segmentation operation may include segmenting the grayscale histogram of the first low-frequency (breast) image based on the segmentation threshold f_Divide to obtain a gland region and a fat region. In some embodiments, a region with smaller gray values than f_Divide may be designated as the gland region, and a region with greater gray values than f_Divide may be designated as the fat region.

In 1207, the minimal gray value determination unit 604 may determine a first grayscale mean value of gland in the low-frequency image based on the segmented first low-frequency image (e.g., the gland region determined in 1205). In some embodiments, a grayscale mean value of all the elements in the gland region may be designated as the first grayscale mean value of gland. The first grayscale mean value of gland may be expressed as "meanGland."

In 1209, the minimal gray value determination unit 604 may determine a second grayscale mean value of fat in the low-frequency image based on the segmented first low-frequency image (e.g., the fat region determined in 1205). In some embodiments, a grayscale mean value of all the elements in the fat region may be designated as the second grayscale mean value of fat. The second grayscale mean value of fat may be expressed as "meanFat."

In 1211, the minimal gray value determination unit 604 may determine the minimal gray value of the at least one grayscale transformation range based on the segmentation threshold, the first grayscale mean value, and the second grayscale mean value. In some embodiments, the minimal gray value of the at least one grayscale transformation range may be determined based on a predetermined function. The predetermined function may include one or more parameters including at least one of the segmentation threshold, the first grayscale mean value, and the second grayscale mean value. The predetermined function may be determined by analyzing the parameters based on clinical data. More descriptions of the determination of the minimal gray value of the at least one grayscale transformation range may be found elsewhere in the present disclosure (e.g., FIGS. 15 and 16, and the descriptions thereof).

It should be noted that the above description of the process 1200 is merely provided for illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in process 1200.

Figure 15:
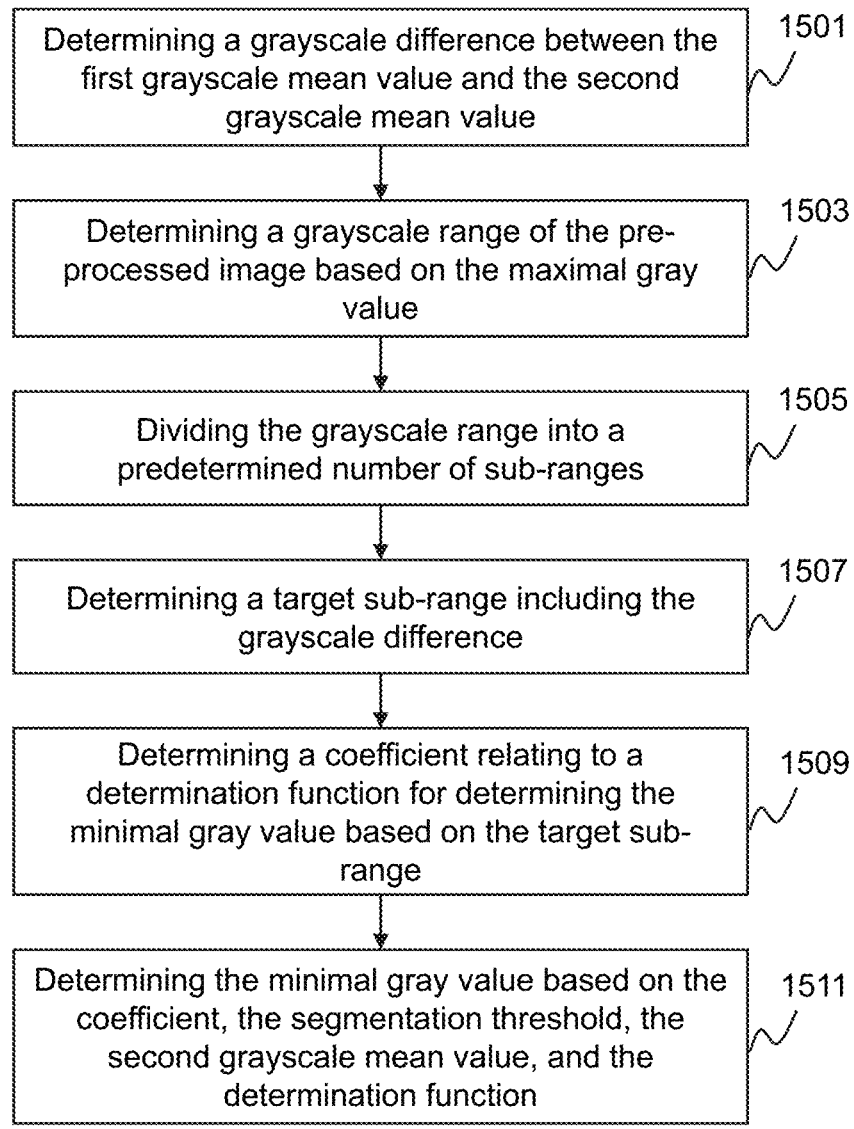
FIG. 15 is a flowchart illustrating an exemplary process for determining a minimal gray value of the at least one grayscale transformation range based on the first grayscale mean value and the second grayscale mean value according to some embodiments of the present disclosure.

FIG. 15 is a flowchart illustrating an exemplary process for determining a minimal gray value of the at least one grayscale transformation range based on the first grayscale mean value and the second grayscale mean value according to some embodiments of the present disclosure. The process 1500 may be performed by an image processing device integrated into an imaging system (e.g., the imaging system 100 as illustrated in FIG. 1), which can be implemented in software and/or hardware. For example, the process 1500 may be stored in the storage device 130 and/or the storage 220 as a form of instructions (e.g., an application), and invoked and/or executed by the processing device 120 (e.g., the processor 210 illustrated in FIG. 2, or one or more modules in the processing device 120 illustrated in FIG. 4). The operations of the illustrated process presented below are intended to be illustrative. In some embodiments, the process 1500 may be accomplished with one or more additional operations not described, and/or without one or more of the operations discussed. Additionally, the order in which the operations of the process 1500 as illustrated in FIG. 15 and described below is not intended to be limiting. Herein a breast image may be taken as an example in the following descriptions for the purpose of illustration. In some embodiments, operation 1211 of the process 1200 illustrated in FIG. 12 may be performed according to the process 1500.

In 1501, the minimal gray value determination unit 604 may determine a grayscale difference between the first grayscale mean value and the second grayscale mean value. In some embodiments, the grayscale difference between the first grayscale mean value meanGland and the second grayscale mean value meanFat may be expressed as "div," that is, div=meanFat−meanGland.

The value of the grayscale difference div can qualitatively characterize the minimal value of the grayscale transformation range. For example, if the value of div is relatively large, the minimal value may be relatively close to the value of f_Divide, i.e., slightly closer to the grayscale of the fat from the segmentation threshold f_Divide. As another example, if the value of div is relatively small, the minimal value may be relatively away from the value of f_Divide, i.e., much closer to the grayscale of the fat from the segmentation threshold f_Divide.

In 1503, the minimal gray value determination unit 604 may determine a grayscale range of the pre-processed image based on the maximal gray value. In some embodiments, the minimal gray value determination unit 604 may perform statistical analysis on gray values of an initial image or pre-processed image to determine a maximum gray value (expressed as "max") and a minimum gray value (expressed as "min"). The grayscale range corresponding to the pre-processed (breast) image may be determined by designating zero or the minimum gray value "min" as the minimum value of the grayscale range, and designating the maximum gray value "max" or an absolute value of a difference between the maximum gray value "max" and the minimum gray value "min" as the maximum value of the grayscale range; that is, the grayscale range may be [0, max] or [min, (max-min)].

In 1505, the minimal gray value determination unit 604 may divide the grayscale range into a predetermined number of sub-ranges. In some embodiments, the predetermined number may be predetermined based on experience, for example, a value between 3 and 10. In some embodiments, the grayscale range may be divided based on the predetermined number and at least one predetermined piecewise value. In some embodiments, the predetermined piecewise value may be predetermined according to a precision of a coefficient k illustrated in operation 1509. Taking the grayscale range [0, max] as an example, if the predetermined number is 5, and the predetermined piecewise values are 100, 180, 230, and 280, then the grayscale sub-ranges may be [0, 100], [101, 180], [181, 230], [231, 280], and [281, max].

In 1507, the minimal gray value determination unit 604 may determine a target sub-range including the grayscale difference. In some embodiments, the minimal gray value determination unit 604 may compare the grayscale difference "div" with each of the grayscale sub-ranges to determine a target sub-range including the grayscale difference "div." For example, if "div" equals 232, the target sub-range may be the fourth grayscale sub-range illustrated in 1506, that is, [231, 280] may be the target sub-range including the grayscale difference "div."

In 1509, the minimal gray value determination unit 604 may determine a coefficient relating to a determination function for determining the minimal gray value based on the target sub-range. In some embodiments, the coefficient (e.g., coefficient k) may be determined based on the grayscale difference "div" and the target sub-range. In some embodiments, in response to a determination that the target sub-range includes a maximal value of the grayscale range, the coefficient k may be determined as a predetermined value (e.g., 1). For example, if the target sub-range is [281, max] illustrated in 1505, the coefficient k may be determined as 1.

In some embodiments, in response to a determination that the target sub-range does not include a maximal value of the grayscale range, the coefficient k may be determined based on the grayscale difference, a maximal value of the target sub-range, and/or a predetermined function. The predetermined function may be used to determine the coefficient k of the determination function. In some embodiments, by analyzing a relationship between the grayscale difference "div" and the minimal gray value of the at least one grayscale transformation range, the predetermined function may be empirically determined according to Equation (2):

$$k(i)=\text{weight}(i)*\text{div}/\text{valueMax}(i), \qquad (2)$$

where i represents a serial number of the target sub-range, "weight" represents a weight value determined based on clinical data, and "valueMax" represents the maximum gray value of the ith grayscale sub-range.

For example, if "div" is 232, the target sub-range is [231, 280], since [231, 280] is a fourth sub-range of the sub-ranges [0, 100], [101, 180], [181, 230], [231, 280], and [281, max], then the serial number i may be 4. Accordingly, valueMax(4) is 280. Assuming that a value of weight(4) is 0.9, then k=0.9*232/280=0.75.

Figure 16:
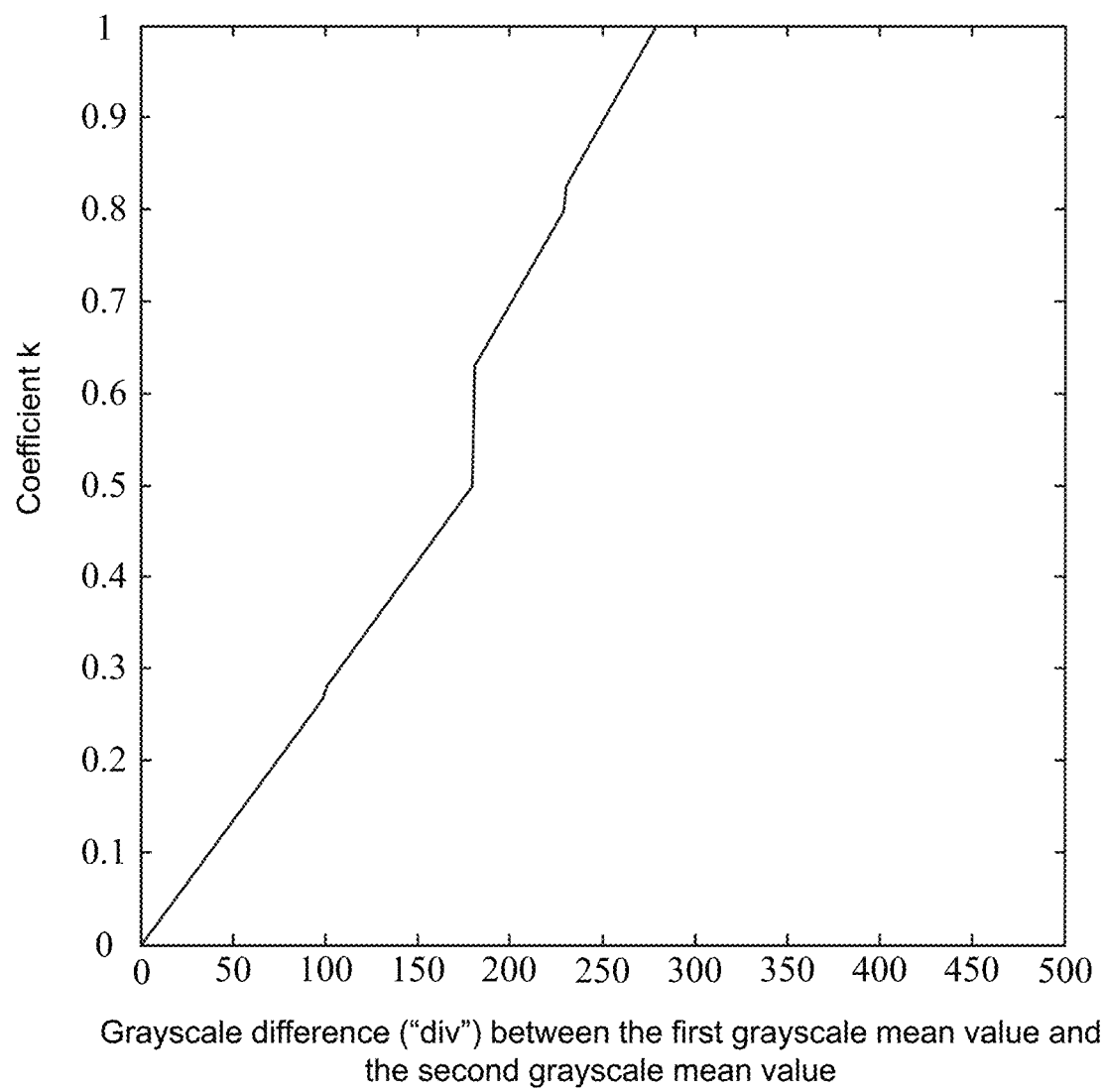
FIG. 16 is a schematic diagram illustrating an exemplary relationship curve between a coefficient k of a determination function and a grayscale difference "div" according to some embodiments of the present disclosure.

In some embodiments, the coefficient k may be determined based on a relationship curve between the coefficient k and the grayscale difference "div." In some embodiments, the relationship curve may be determined based on Equation (2) and one or more empirical values of weight(i). An exemplary relationship between the coefficient k and the grayscale difference "div" is illustrated in FIG. 16, which shows an exemplary relationship curve between a coefficient k of a determination function and a grayscale difference "div" according to some embodiments of the present disclosure. The grayscale difference "div" may refer to a difference between the first grayscale mean value and the second grayscale mean value.

In 1511, the minimal gray value determination unit 604 may determine the minimal gray value based on the coefficient, the segmentation threshold, the second grayscale mean value and the determination function. In some embodiments, the determination function may be expressed by Equation (3):

$$\text{MinGray}=k*f\_\text{Divide}+(1-k)*\text{meanFat}, \qquad (3)$$

where "MinGray" represents the minimal gray value of the at least one grayscale transformation range, k represents the coefficient determined in 1509, "f_Divide" represents the segmentation threshold determined in 1203, and "meanFat" represents the second grayscale mean value (i.e., the grayscale mean value of the fat region) determined in 1209. It should be noted that according to Equation (3), if k equals 1, the minimal gray value "MinGray" of the grayscale transformation range may be the segmentation threshold "f_Divide," reaching the limit of the minimal gray value.

It should be noted that the above description of the process 1500 is merely provided for illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in process 1500.

Figure 17:
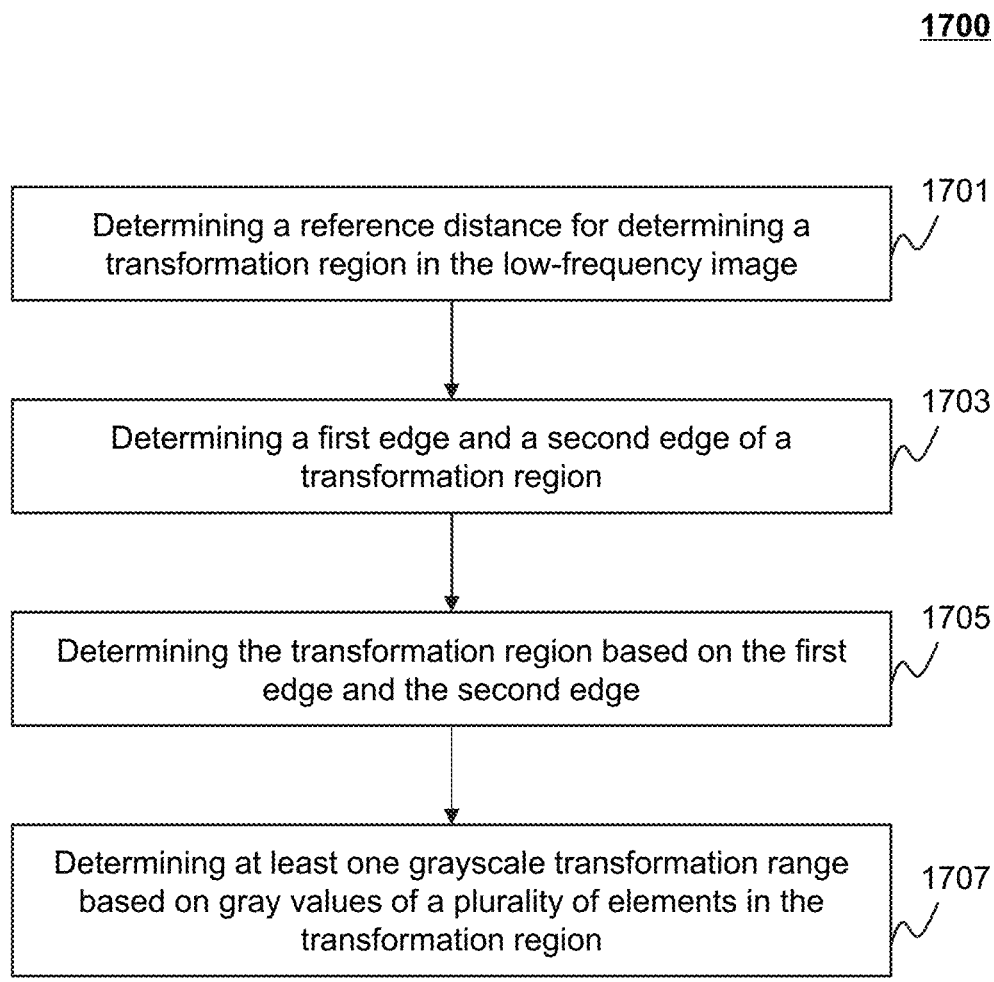
FIG. 17 is a flowchart illustrating an exemplary process for determining at least one grayscale transformation range based on a transformation region according to some embodiments of the present disclosure.

FIG. 17 is a flowchart illustrating an exemplary process for determining at least one grayscale transformation range based on a transformation region according to some embodiments of the present disclosure. The process 1700 may be performed by an image processing device integrated into an imaging system (e.g., the imaging system 100 as illustrated in FIG. 1), which can be implemented in software and/or hardware. For example, the process 1700 may be stored in the storage device 130 and/or the storage 220 as a form of instructions (e.g., an application), and invoked and/or executed by the processing device 120 (e.g., the processor 210 illustrated in FIG. 2, or one or more modules in the processing device 120 illustrated in FIG. 4). The operations of the illustrated process presented below are intended to be illustrative. In some embodiments, the process 1700 may be accomplished with one or more additional operations not described, and/or without one or more of the operations discussed. Additionally, the order in which the operations of the process 1700 as illustrated in FIG. 17 and described below is not intended to be limiting. Herein a breast image may be taken as an example in the following descriptions for the purpose of illustration. In some embodiments, operation 705 of the process 700 illustrated in FIG. 7 may be performed according to the process 1700.

In 1701, the reference distance determination unit 606 may determine a reference distance for determining a transformation region in the low-frequency image. In some embodiments, the reference distance may be determined based on a breast width, the compression thickness, and a predetermined distance determination model. More descriptions of the determination of the reference distance may be found elsewhere in the present disclosure (e.g., FIGS. 7 and 19, and the descriptions thereof).

Figure 18:
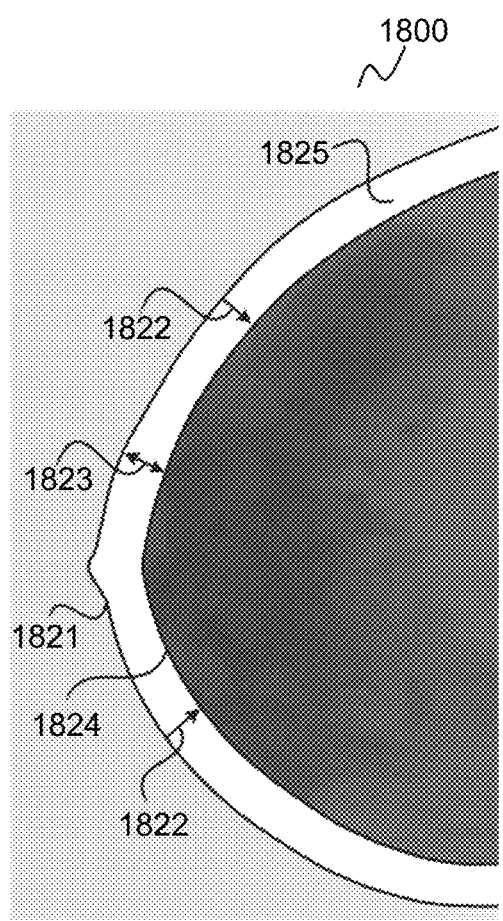
FIG. 18 is a schematic diagram of a LOG breast image including transformation region according to some embodiments of the present disclosure.

In 1703, the transformation region determination unit 608 may determine a first edge and a second edge of a transformation region. In some embodiments, the first edge may be a contour (e.g., a breast contour) in the pre-processed image or low-frequency image. In some embodiments, the second edge may be an edge away from the breast contour. In some embodiments, the second edge may be a boundary that is similar to the breast contour in the pre-processed image or low-frequency image. The boundary may be determined by extending, along a radial direction, from the breast contour to the inside of the breast by a distance (e.g., the reference distance). That is, the distance between the second edge and the first edge may be equal to the reference distance. Taking a LOG image 1820 shown in FIG. 18 as an example, a boundary 1824 similar to the breast contour 1821 may be determined as the second edge. FIG. 18 is a schematic diagram of a LOG breast image 1800 including a transformation region according to some embodiments of the present disclosure. The breast counter 1821 may be determined as the first edge. The boundary 1824 may be determined by extending, along a radial direction 1822 of the breast, from the breast contour 1821 to the inside of the breast by the reference distance 1823.

In 1705, the transformation region determination unit 608 may determine the transformation region based on the first edge and the second edge. The transformation region may be a region between the first edge and the second edge. Taking the LOG image 1800 shown in FIG. 18 as an example, a region 1825 between the boundary 1824 (the second edge) and the breast contour 1821 (the first edge) may be the transformation region of the LOG image 1800.

In 1707, the grayscale transformation range determination block 506 may determine at least one grayscale transformation range based on gray values of a plurality of elements in the transformation region. In some embodiments, the plurality of elements in the transformation region may include a first set of elements on the first edge and a second set of elements on the second edge. In some embodiments, the first set of elements may include all the elements on the first edge. In some embodiments, the second set of elements may include all the elements on the second edge. In some embodiments, a maximal gray value of the first set of elements may be designated as a maximal value of the at least one grayscale transformation range. In some embodiments, a mean gray value of the second set of elements may be designated as a minimal value of the at least one grayscale transformation range. The at least one grayscale transformation range may be determined based on the maximal gray value and the minimal gray value.

It should be noted that the above description of the process 1700 is merely provided for illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in process 1700. As another example, operation 1705 may be omitted.

Figure 19:
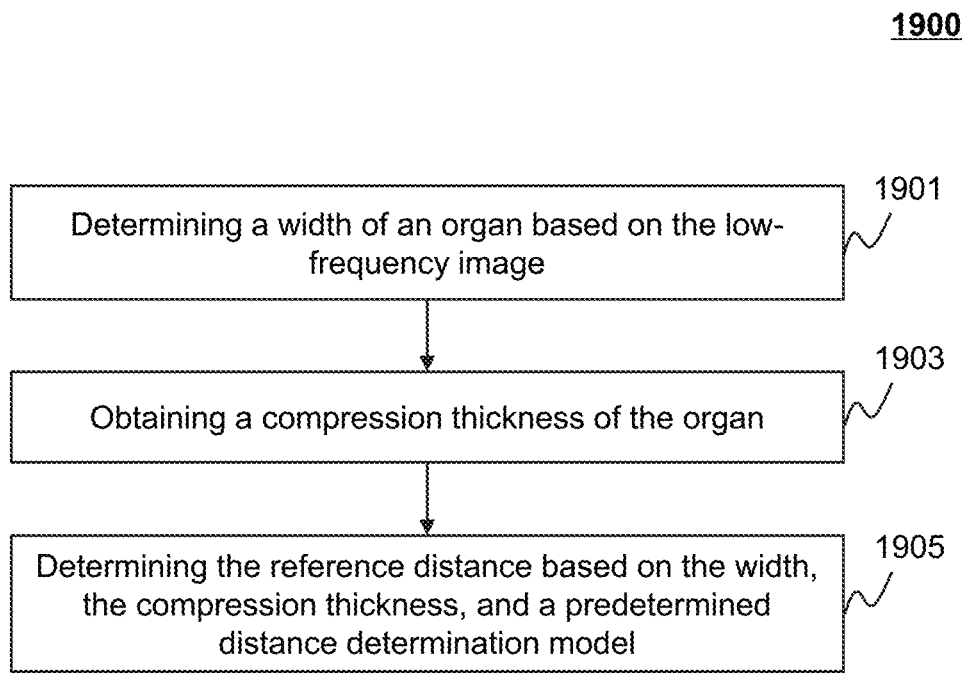
FIG. 19 is a flowchart illustrating an exemplary process for determining a reference distance based on a predetermined distance determination model according to some embodiments of the present disclosure.

FIG. 19 is a flowchart illustrating an exemplary process for determining a reference distance based on a predetermined distance determination model according to some embodiments of the present disclosure. The process 1900 may be performed by an image processing device integrated into an imaging system (e.g., the imaging system 100 as illustrated in FIG. 1), which can be implemented in software and/or hardware. For example, the process 1900 may be stored in the storage device 130 and/or the storage 220 as a form of instructions (e.g., an application), and invoked and/or executed by the processing device 120 (e.g., the processor 210 illustrated in FIG. 2, or one or more modules in the processing device 120 illustrated in FIG. 4). The operations of the illustrated process presented below are intended to be illustrative. In some embodiments, the process 1900 may be accomplished with one or more additional operations not described, and/or without one or more of the operations discussed. Additionally, the order in which the operations of the process 1900 as illustrated in FIG. 19 and described below is not intended to be limiting. In some embodiments, operation 1701 of the process 1700 illustrated in FIG. 17 may be performed according to the process 1900.

In 1901, the reference distance determination unit 606 may determine a width of an organ (or tissue) based on the low-frequency image. In some embodiments, the organ (or tissue) may be a breast. In some embodiments, the breast width may be determined automatically or manually. In some embodiments, the breast width may be used as an independent variable of a distance determination model. More descriptions of the determination of the breast width may be found elsewhere in the present disclosure (e.g., FIG. 7 and the description thereof).

In 1903, the reference distance determination unit 606 may obtain a compression thickness of the organ (e.g., the breast). In some embodiments, the compression thickness of the organ may refer to a breast compression thickness. In some embodiments, the breast compression thickness may be determined automatically or manually. In some embodiments, the breast compression thickness may be obtained based on the imaging parameters that are used in imaging of the breast by the imaging system 100. The breast compression thickness may be used as an independent variable of a distance determination model. More descriptions of the breast compression thickness may be found elsewhere in the present disclosure (e.g., FIGS. 7 and 8, and the descriptions thereof).

In 1905, the reference distance determination unit 606 may determine the reference distance based on the width, the compression thickness, and a predetermined distance determination model. In some embodiments, the width and the compression thickness may be two parameters of the predetermined distance determination model. The determined reference distance may be further used for determining at least one grayscale transformation range in the present disclosure. In some embodiments, the predetermined distance model may be a statistical model or an intelligent algorithm model (e.g., a machine learning model). For example, the predetermined distance model may be expressed by Equation (4):

$$\text{Dis} = a*W + b*T + c, \tag{4}$$

wherein "Dis" represents the reference distance, W represents the breast width, T represents the breast compression thickness, and a, b, and c represent coefficients of the predetermined distance model, respectively. In some embodiments, the coefficients of the predetermined distance model may be determined by training the model based on multiple sets of training parameters. In some embodiments, each set of the multiple sets of training parameters may include a historical breast width, a historical breast compression thickness, and a historical reference distance corresponding to a historical breast image. In some embodiments, the coefficients of the predetermined distance model may be determined based on empirical values.

It should be noted that the above description of the process 1900 is merely provided for illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in process 1900.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
   at least one storage device including a set of instructions or programs; and
   at least one processor configured to communicate with the at least one storage device, wherein when executing the set of instructions or programs, the at least one processor is configured to cause the system to:
     obtain a pre-processed image;
     decompose the pre-processed image into a low-frequency image and a high-frequency image;
     determine at least one grayscale transformation range based on the low-frequency image;
     determine at least one grayscale transformation parameter based on the at least one grayscale transformation range;
     obtain a transformed low-frequency image by transforming the low-frequency image based on the at least one grayscale transformation parameter; and
     generate a transformed image by reconstructing the transformed low-frequency image and the high-frequency image.

2. The system of claim 1, wherein to obtain the pre-processed image, the at least one processor is configured to cause the system to:
   obtain the pre-processed image by performing a logarithmic transformation on an initial image.

3. The system of claim 1, wherein to obtain the pre-processed image, the at least one processor is configured to cause the system to:
   obtain a segmented image by segmenting an initial image; and
   obtain the pre-processed image by performing a logarithmic transformation on the segmented image.

4. The system of claim 1, wherein to obtain the pre-processed image, the at least one processor is configured to cause the system to:
   obtain an intermediate image by performing a logarithmic transformation on an initial image; and
   obtain the pre-processed image by segmenting the intermediate image.

5. The system of claim 1, wherein to determine the at least one grayscale transformation range based on the low-frequency image, the at least one processor is configured to cause the system to:
   obtain a segmented low-frequency image by segmenting the low-frequency image; and
   determine the at least one grayscale transformation range based on the segmented low-frequency image.

6. The system of claim 1, wherein to determine the at least one grayscale transformation parameter based on the at least one grayscale transformation range, the at least one processor is configured to cause the system to:
   determine a reference edge in the low-frequency image;
   determine a plurality of distances between a plurality of elements in the low-frequency image and the reference edge;
   determine a plurality of mean gray values corresponding to the plurality of distances;
   determine a characteristic curve based on the plurality of mean gray values and the plurality of distances; and
   determine a transformation curve associated with the at least one grayscale transformation parameter based on the characteristic curve.

7. The system of claim 1, wherein to determine the at least one grayscale transformation range based on the low-frequency image, the at least one processor is configured to cause the system to:
   determine a reference distance for determining a transformation region in the low-frequency image;
   determine a first edge and a second edge of the transformation region, wherein:
     the first edge is a contour in the pre-processed image; and
     a distance between the second edge and the first edge is equal to the reference distance;
   determine the transformation region based on the first edge and second edge; and
   determine the at least one grayscale transformation range based on gray values of a plurality of elements in the transformation region.

8. The system of claim 7, wherein to determine the at least one grayscale transformation range based on the gray values of the plurality of elements in the transformation region, the at least one processor is configured to cause the system to:
   determine a maximal gray value of a first set of elements on the first edge;
   determine a mean gray value of a second set of elements on the second edge; and
   determine the at least one grayscale transformation range based on the maximal gray value and the mean gray value.

9. The system of claim 7, wherein to determine the reference distance for determining the transformation region in the low-frequency image, the at least one processor is configured to cause the system to:
   determine a width of a target organ based on the low-frequency image;
   obtain a compression thickness of the target organ; and determine the reference distance based on the width, the compression thickness, and a predetermined distance determination model.

10. The system of claim 1, wherein to determine the at least one grayscale transformation range based on the low-frequency image, the at least one processor is configured to cause the system to:
   determine the at least one grayscale transformation range based on the pre-processed image, a first grayscale distribution characteristic of a first tissue in the low-frequency image, and a second grayscale distribution characteristic of a second tissue in the low-frequency image.

11. The system of claim 10, wherein the first tissue includes gland and the second tissue includes fat.

12. The system of claim 10, wherein to determine the at least one grayscale transformation range based on the pre-processed image, the first grayscale distribution characteristic of the first tissue in the low-frequency image, and the second grayscale distribution characteristic of the second tissue in the low-frequency image, the at least one processor is configured to cause the system to:
   determine a maximal gray value of the pre-processed image;
   determine a minimal gray value of the at least one grayscale transformation range based on the first grayscale distribution characteristic and the second grayscale distribution characteristic; and
   determine the at least one grayscale transformation range based on the maximal gray value and the minimal gray value.

13. The system of claim 12, wherein to determine the minimal gray value of the at least one grayscale transformation range based on the first grayscale distribution characteristic and the second grayscale distribution characteristic, the at least one processor is configured to cause the system to:
   generate a first low-frequency image by editing the low-frequency image;
   segment the first low-frequency image based on a segmentation threshold;
   determine a first grayscale mean value of the first tissue in the low-frequency image based on the segmented first low-frequency image;
   determine a second grayscale mean value of the second tissue in the low-frequency image based on the segmented first low-frequency image; and
   determine the minimal gray value of the at least one grayscale transformation range based on the segmentation threshold, the first grayscale mean value, and the second grayscale mean value.

14. The system of claim 13, wherein to generate the first low-frequency image by editing the low-frequency image, the at least one processor is configured to cause the system to:
   determine a width of a target organ based on the low-frequency image;
   edit the low-frequency image by clipping the low-frequency image based on the width of the target organ to obtain a second low-frequency image; and
   generate the first low-frequency image by editing a histogram of the second low-frequency image.

15. The system of claim 14, wherein to determine the width of the target organ based on the low-frequency image, the at least one processor is configured to cause the system to:

determine a third low-frequency image by removing a first predetermined region of the low-frequency image or by extracting a second predetermined region of the low-frequency image, the first predetermined region including a non-target organ, the second predetermined region including at least a portion of the target organ; and
determine a maximal distance between a contour of the target organ and an edge of the third low-frequency image, the edge of the third low-frequency image being opposite to the contour of the target organ.

16. The system of claim 13, wherein to determine the minimal gray value of the at least one grayscale transformation range based on the segmentation threshold, the first grayscale mean value, and the second grayscale mean value, the at least one processor is configured to cause the system to:
   determine a grayscale difference between the first grayscale mean value and the second grayscale mean value;
   determine a grayscale range of the pre-processed image based on the maximal gray value;
   divide the grayscale range into a predetermined number of sub-ranges;
   determine a target sub-range including the grayscale difference; and
   determine the minimal gray value based on the target sub-range, the segmentation threshold, and the second grayscale mean value.

17. The system of claim 16, wherein to determine the minimal gray value based on the target sub-range, the segmentation threshold, and the second grayscale mean value, the at least one processor is configured to cause the system to:
   determine a coefficient relating to a determination function for determining the minimal gray value based on the target sub-range; and
   determine the minimal gray value based on the coefficient, the segmentation threshold, the second grayscale mean value, and the determination function.

18. The system of claim 17, wherein to determine the coefficient relating to the determination function for determining the minimal gray value based on the target sub-range, the at least one processor is configured to cause the system to:
   in response to the determination that the target sub-range includes a maximal value of the grayscale range, determine the coefficient as a predetermined value; and
   in response to the determination that the target sub-range does not include a maximal value of the grayscale range, determine the coefficient based on the grayscale difference and a maximal value of the target sub-range.

19. A method implemented on at least one device each of which has at least one processor and a storage for image processing, the method comprising:
   obtaining a pre-processed image;
   decomposing the pre-processed image into a low-frequency image and a high-frequency image;
   determining at least one grayscale transformation range based on the low-frequency image;
   determining at least one grayscale transformation parameter based on the at least one grayscale transformation range;
   obtaining a transformed low-frequency image by transforming the low-frequency image based on the at least one grayscale transformation parameter; and generating a transformed image by reconstructing the transformed low-frequency image and the high-frequency image.

20. A non-transitory computer readable medium embodying a computer program product, the computer program product comprising instructions configured to cause a computing device to:
- obtain a pre-processed image;
- decompose the pre-processed image into a low-frequency image and a high-frequency image;
- determine at least one grayscale transformation range based on the low-frequency image;
- determine at least one grayscale transformation parameter based on the at least one grayscale transformation range;
- obtain a transformed low-frequency image by transforming the low-frequency image based on the at least one grayscale transformation parameter; and
- generate a transformed image by reconstructing the transformed low-frequency image and the high-frequency image.

* * * * *